United States Patent Office 3,488,517
Patented Jan. 6, 1970

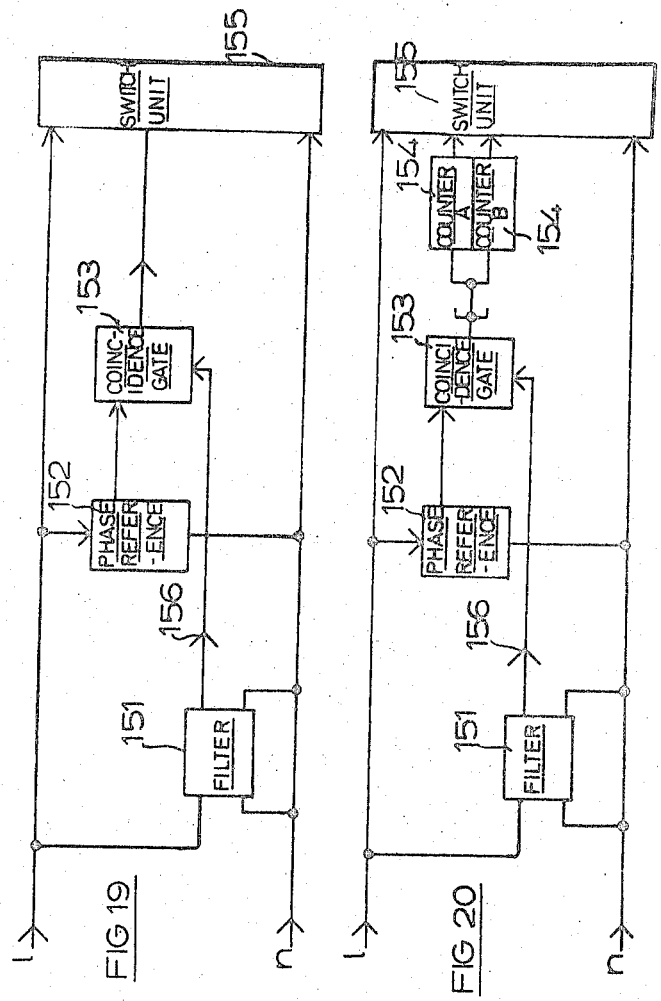

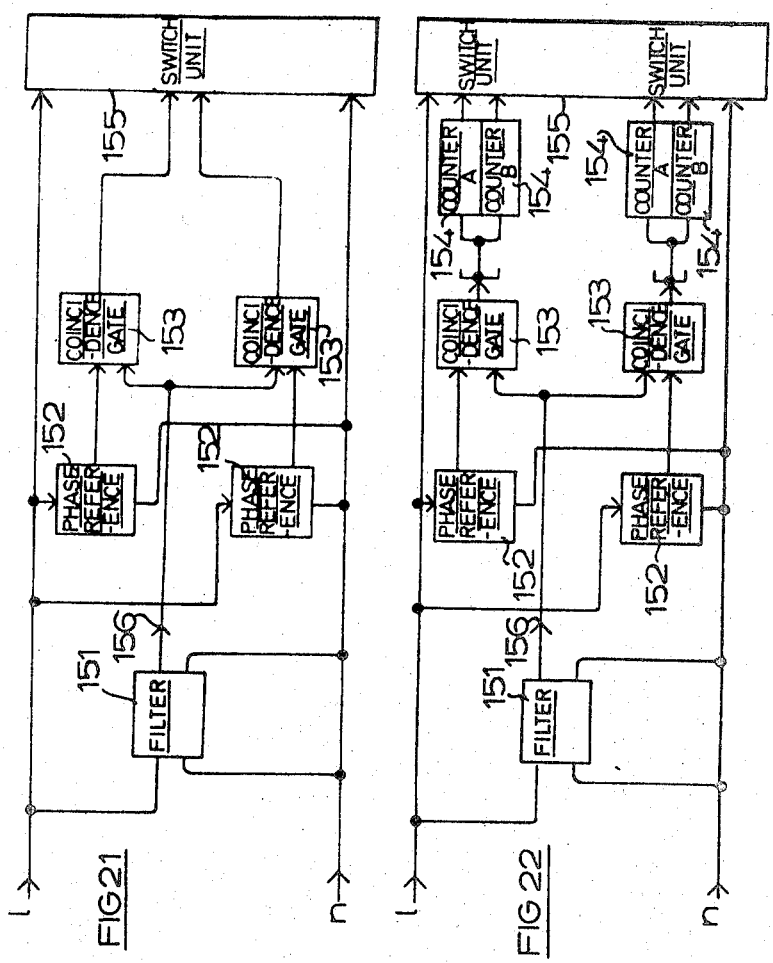

3,488,517
CONTROL SYSTEMS
James Macmillan Cowan, Wirral, Frederic Edwin Brooker, Liverpool, Brian Nield, Christleton, William James Stuart Rogers, Ellesmere Port, Edmund Smith, Maghull, Frank Tarpey, Widnes, and John Durnford, Liverpool, England, assignors to The Merseyside and North Wales Electricity Board
Filed June 26, 1967, Ser. No. 648,826
Claims priority, application Great Britain, June 29, 1966, 29,085/66
Int. Cl. H04b 3/54
U.S. Cl. 307—3
57 Claims

ABSTRACT OF THE DISCLOSURE

There is disclosed systems for transmitting control information and intelligence over an electric power distribution network by substantially uni-directional pulses created at predetermined points in successive or spaced groups of cycles of the voltage impressed on the network. Pulses in each of a series of successive cycles can be created by drawing a direct current component from one secondary winding of a transformer in the network. Pulses can be injected by discharging a capacitor onto the line at a predetermined point in any selected cycle directly or through a tuned circuit including a transformer secondary winding. Pulses created by either method can be used alone or together when one type can serve as a select command and the other as an operate command to receivers elsewhere on the network.

---

The present invention relates to control systems and is more particularly concerned with systems for transmitting control intelligence over an electricity distribution system from one location to another.

In electricity distribution systems it is often desirable to be able to control an operation of an ancillary device at one location from a control unit at another location. One way of effecting this is to utilize separate additional or pilot cables connecting the locations. This is expensive and various proposals have been made for injecting suitable control signals onto the distribution network and providing receiving or detecting units at remote locations. For example, it has been proposed to inject an audio frequency signal into an electricity mains distribution system at one location and to provide at one or more remote locations a receiving unit selectively responsive to the injected audio frequency. In one such so-called ripple control system different frequencies of control signal have been injected for different purposes and the receiving units are responsive either to a single frequency of control signal or to two or more frequencies. In another ripple control system, a single frequency of control signal has been used but the signals have been in the form of two or more time-spaced signals and different time intervals between successive groups of signals have been used to provide for selective control. For the purpose of injecting such ripple control signals into a distribution network, quite extensive equipment has been required including, for example, a motor alternator set for generating control signals of the required frequency, timing and gating means for connecting the control signals in a predetermined time-spaced pattern and interconnecting means, including capacitors or current transformers for injecting the control signals into the distribution network, either in parallel or in series. Such equipment is costly in terms of caiptal expenditure, is expensive in terms of ground space required, and is inefficient in operation in that considerable power is required in operating the injection equipment and only a relatively small fraction of said power is usefully employed in operating the receiving units at remote locations. Furthermore, unless adequate precautions are taken in selecting the frequency or frequencies of the injected ripple signals, their duration and their time spacing, there is a risk that undesired operation of receiving equipment may ensue from switching surges or harmonics of the mains frequency appearing in the distribution network as a result of the operation of certain current consuming appliances connected thereto.

According to the present invention a system of transmitting and receiving intelligence or control information over an alternating current power supply network comprises means at one location on the network for creating in a voltage impressed on the network at least one uni-directional pulse, the or each pulse occurring at a predetermined point in a cycle of said voltage and, at at least one other location on the network, receiving means for detecting said pulse or pulses.

The period throughout which the pulses are created may extend over several seconds or may be one second or less, and the receiving means may distinguish between such periods and provide different output signals. Moreover, the point in a cycle at which a pulse occurs may be varied from one series of pulses to another and the receiving means may incorporate phase discriminator means for detecting the phase of the pulses relatively to a cycle of the impressed voltage and selecting which of two or more output signals is to be provided. Moreover, when the series of pulses extends over one second or less, the receiving means may include counting means for counting the number of successive cycles of the impressed voltage in which a pulse occurs, and by selecting different numbers of cycles for different pieces of information to be transmitted, the receiving means can be selective and arranged to deliver an appropriate output signal in accordance with the number of cycles so counted. Furthermore, all the pulses in a series need not be in successive cycles but may be split into two or more groups, adjacent groups being separated by at least one cycle in which no pulse occurs; a group may comprise as few as one pulse but preferably comprises a pulse in each of several successive cycles. Series of pulses of relatively long duration, that is whose period extends over several seconds, and series of pulses of relatively short duration, that is whose period is one second or less, may be used conjointly; for example a short duration series of pulses may first be transmitted and serve to select which of several output signals is to be conditioned or even to indicate whether or not a particular receiving means is required to be operative, and a long duration series of pulses may subsequently be transmitted to originate the output signals from the receiving means.

Each pulse created is of sufficiently short duration and of sufficiently small magnitude as to be in insignificant disturbance of the impressed voltage so far as any conventional supply frequency current consuming device is concerned. The duration expressed as a fraction of a cycle of the impressed voltage is preferably not more than about $\frac{1}{20}$ and may be as short as $\frac{1}{100}$ or less. Moreover, as the pulses in each series are created regularly, each at a predetermined point in a different cycle and in a predetermined number of cycles and each with substantially constant magnitude and duration, such pulses can be distinguished from transients and surges or other noise which may arise on the network from other causes.

The series of pulses can be created directly in the distribution network or can be injected thereinto.

We have found that pulses may be created by loading a supply transformer in the distribution network in such a manner that a direct current component is drawn from the transformer; under these circumstances the transformer can be regarded effectively as a relatively powerful harmonic generator. The effect of such direct current component is to generate a uni-directional component of flux in at least one limb of the core of the transformer and other means for generating a uni-directional flux component may be used. One convenient way of drawing such direct current component lies in connecting a rectifier and resistor combination across one winding, preferably a secondary winding, of the transformer.

If the transformer has a two limb core the uni-directional or D.C. flux component will be developed in one direction in one limb and in the other direction in the other limb, but if the transformer core has more than two limbs the D.C. flux is developed in one direction in one limb and in the other direction in each of the other limbs and will be of greater magnitude in the one limb. In the case of a transformer having three limbs, such as one having three phase primary and/or secondary windings, the greater magnitude D.C. flux component may be developed in the centre limb of the core and this, as is hereinafter described, will create pulses in the voltage derived from any secondary windings on that core if the primary windings of the transformer are connected to a source of power. If the greater magnitude D.C. flux component is developed in each of the limbs of the core in turn, pulses will be created in each of the voltages derived from secondary windings on each limb in turn. Furthermore, by reversing the direction of the D.C. flux component the point in each cycle of the impressed voltage at which each pulse is created will be changed by substantially 180°, thereby providing a convenient way in which two different series of pulses each corresponding to different information of control intelligence can be created, and such series can be distinguished from one another if phase discriminators are included in the receiving means.

Uni-directional or D.C. flux component can be readily developed in a three limbed transformer core of a three phase transformer by connecting a rectifier and resistor network between the three phases of three star-connected windings such that a uni-directional flux is developed in one direction in each of the outer limbs and in the opposite direction in the centre limb of the core of the transformer. When such a D.C. flux is built up, it is still necessary for the proper functioning of the three-phase transformer that the A.C. flux changes in the three windings be nearly the same as they would be if no D.C. flux were present. This follows from the relationship between the applied voltage and the rate of change of flux. But since the magnitude of the D.C. flux and the magnitude of the A.C. flux added together may be such as to require at least part of the transformer iron to be saturated, then during the time that the iron is saturated there will be a requirement for a relatively large magnetising current entirely in accordance with the $B:H$ properties of the transformer magnetic circuit.

In a transformer the normal relationship between flux $\theta$ and the voltage E applied to a winding of T turns is $$E = T\frac{d\phi}{dt} \text{ or } \phi = \neq \int E dt$$

so that there is a 90° phase displacement between the voltage and the flux waveforms, i.e. when the flux is a maximum the voltage is zero, and when the voltage is a maximum the flux is zero, so that when the D.C. magnetisation condition exists, there is a period when the total flux, that is, the sum of the D.C. flux and the peak A.C. flux are much higher than the normal value of flux where no D.C. flux is present, and during this period a pulse of magnetising current will be drawn from the supply system and this will take place around voltage zero as the voltage varies in one of the two possible directions.

The duration of the pulse will be of the order of $\frac{1}{20}$ of a cycle, or about 1 millisecond, and it will occur once only in each cycle. This current pulse has a D.C. component and 2nd, 4th, 8th, etc., harmonic components. The effect of drawing these pulses of current through the higher voltage system to the higher voltage side of the transformer is to create a modulation of the voltage wave as the voltage wave passes through zero in one direction.

By changing the polarity of the D.C. flux, the modulation of the voltage wave may be made to take place as the voltage passes through zero in the opposite direction, i.e. with a phase displacement of 180° with respect to the previous case.

One way in which the pulses can be injected into the network comprises charging a capacitor from a direct current potential source and discharging such capacitor into the network through a gate switch which is opened at a predetermined point in a cycle of the voltage impressed on the network. Whilst the capacitor can be charged from a separate direct current source, it may conveniently be charged through a rectifier from the network and preferably from the voltage impressed on the network into which the capacitor is to be discharged. The effect of the discharge of the capacitor is to produce a very small discontinuity in the wave form of the voltage impressed across the network. The extent of such discontinuity expressed in terms of amplitude may be less than 100th part of the amplitude of the voltage impressed on the network so as to have little or no significant effect on any current consuming device connected to the network. Alternatively the capacitor may discharge into the network through a tuned circuit. This tuned circuit comprises the windings on one limb of a transformer forming part of the supply network, an inductor and a second capacitor connected in a series circuit. In this arrangement the first-mentioned capacitor is connected in parallel with the inductor of the tuned circuit through a limiting impedance and the gate switch.

Reliability of operation is a very desirable attribute for any control system and it is believed that by utilizing together both the supply transformer D.C. loading method and the capacitor injection method for creating pulses in a network a control system of enhanced reliability can be obtained. These two methods of creating pulses differ from one another in their effect.

Reliability of any signalling or intelligence transmitting control system requires that with the system operating correctly, that is to say with control signals or pulses correctly created, correctly transmitted and correctly received, there will be 100% certainty that any operation, such as of switching devices or relays associated with receiving means, which are required to be carried out, are in fact carried out, and that such requirement be satisfied in the presence of noise or other disturbances which may be classed as severe in relation to the control signals or pulses. Such noise or other disturbances may arise accidentally or at random such as would be regarded as a natural hazard or may be created deliberately by an unauthorized person having acquired knowledge of the signalling or control system.

In this context, the use of a transformer as an harmonic generator can produce a reliable method of signalling without any unrealistic complication of the receiving means. The capacitor discharge method, on the other hand, may be made reliable, in the absence of severe noise, at a cost; but with severe noise present there is a possibility that reliable code detection would be impossible.

Noise in the case of a transformer as an harmonic generator is not a problem. Noise of a kind comparable to the generated signal does not exist normally and would not be tolerated by a supply authority if it arose; the harmonic power involved is such that it would be uneconomic for a person to deliberately produce signals of the same order and inject them onto or create them in the system in order to prevent operation of receiving means on his own premises.

Reliability, therefore, may be achieved by applying the transformer harmonic generator principle to create two polarities of pulse signals and/or to create signals of either or both the different polarity signals for different lengths of time. In addition, the capacitor discharge method may be applied to carry information of a complementary nature, for example to inhibit a relay associated with each of certain selected receiving means from operating. With such a scheme, it may be arranged that deliberate interference by the injection of easily produced capacitor discharge pulse signals by a consumer would only have a result detrimental to the supply of the consumer himself.

It has been mentioned already that the invention contemplates the use of two different forms of series of pulses created in the voltage impressed on the supply or distribution network. One form of pulse comprises signals with a time duration of the order of 1 millisecond; the other form involves signals, with a time duration which may be two or three microseconds or less.

One suitable form of receiving means comprises basically a high pass filter connectable to the distribution network for feeding signals to pulse signal responsive detector means, adapted to provide an output signal in response to signals from the filter corresponding to an appropriate series of pulses. The filter may comprise a capacitor-inductor circuit of which the inductor may include a Ferrite core or may include a toroid core which need not be of magnetic material. The inductor is preferably provided with a secondary winding from which signals may be fed to the detector means. The inductor and capacitor may be serially connected and form a tuned circuit. Such a tuned circuit functions as a double-differentiating circuit and can provide, in response to pulses created in the voltage impressed on the network to which it is connected, output signals which are sufficiently magnified to operate the detector means. The detector means may comprise a coincidence gate which is conditioned by a phase reference signal derived from the voltage impressed on the network so as to pass a signal on when it occurs at a predetermined point in a cycle. Such signal can then be passed to a suitable output device.

A simple form of receiving means only provides a single output, but by providing two coincidence gates and deriving two different phase reference signals from the voltage impressed on the network, each phase reference signal corresponding to a different predetermined point in a cycle, two outputs or a single reversible output can be obtained. For this purpose a single output device such as a bi-stable switching circuit or a latching relay can be embodied in the receiving means such that one series of pulses can result in an ON output and a different series of pulses in an OFF output.

By incorporating in receiving means one or more counters adapted to count pulse signals in successive cycles series of pulses of different total time duration can be distinguished from one another. Such a counter may be adapted to count only signals in successive cycles and to be reset in the absence of a signal in any one cycle. With receiving means embodying a filter, one coincidence gate to which a single phase reference signal is applied, two different counter, and a bi-stable switching circuit, two outputs can be derived from two series of pulse, each pulse occurring at the same predetermined point in a cycle but each series occurring in a different number of successive cycles. Other ceries of pulses may be created in the voltage impressed on the network but such receiving means will not respond to them though other receiving means may be designed to be responsive to such other series: thus each series of pulses effectively serves two purposes, namely to select and to operate. Obviously any desired number of coincidence gates, means for deriving different phase reference signals, counters and output devices may be embodied in receiving means in accordance with the series of pulses to be created and the outputs required.

When both the transformer D.C. loading method and the capacitor injection method are used in conjunction with one another, means are preferably incorporated in receiving means to distinguish series of pulses of short total duration, such as can be created by the capacitor injection method, from series of pulses of long total duration, such as can be created by the transformer loading method. Such distinction can be obtained from one or more timing or integrating devices: thus for example signals from a coincidence gate may be applied both to a timing device and to a further gate which is normally inhibited but is conditioned only on receipt of a signal from the timing device to pass the signal from the coincidence gate to an output device. Alternatively a counter may be used. However, in a preferred arrangement it is envisaged that a series of pulses of long total duration will be preceded by a series of pulses of short total duration. By using one or more means such as counters to count or otherwise decode such series of pulses of short total duration and condition one or more gates, and by using the same or other counters or timing devices to apply a signal to such gates, for onward transmission to one or more outpart devices only in response to series of pulses of long total duration, the series of pulses of short total duration can effectively serve as select commands and the series of pulses of long total duration as operate commands.

Provision may also be made for utilizing series of pulses of long total duration for certain control intelligence without their being preceded by a series of pulses of short total duration. This may be especially valuable for effecting switch off operations in respect of certain current consuming appliances at consumer's premises. A useful feature of the series of pulses of long total duration created by the transformer D.C. loading method lies in the fact that not only are the pulses created in a voltage impressed on the distribution network connected to the secondary winding of the transformer, but a related disturbance is also created in the higher-voltage network connected to the primary windings of the transformer. Since in most cases the primary windings of other transformers will be connected to the latter network, such disturbances will be reflected into the voltages impressed on other distribution networks connected to the secondary windings of such other transformers and may be detected by receiving means connected thereto. Thus the transformer D.C. loading method may be utilized not only to create series of pulses in a voltage impressed on the distribution network connected to the secondary windings of that transformer but also in a voltage impressed on other distribution networks by other transformers with primary windings connected in parallel with the primary windings of that transformer. In this way control intelligence can be transmitted from one sub-station to another through a high voltage network, whilst the apparatus for creating the series of pulses and for receiving them need only be at medium voltage. Furthermore by D.C. loading more than one transformer connected to the same high voltage network each transformer so loaded will create its own related disturbances in the high voltage distribution network; all such disturbances will be synchronised with one another and cumulative, and result in a greatly increased disturbance which can be effective over a much wider area of network, and can indeed be transmitted to other distribution networks at higher voltage feeding such high voltage network. In practice the pulses resulting from the D.C. loading of one transformer at one sub-station can be detected by receiving means at one or more other sub-stations having transformers connected to the same high voltage network and each such receiving means can cause its associated transformer to be D.C. loaded preferably for a predetermined time duration. A number of coded signals may be transmitted, half representing ON signals and half representing OFF signals, the difference between these being due to the two possible polarities of D.C. flux; additional coding may be achieved by causing the D.C. flux component in the three limbs of the three-phase transformer to flow in any one of a number of alternative paths. Moreover where two or more transformers are connected in parallel between the same higher voltage network and the same medium voltage network, it is possible to create contemporaneously pulses in the voltage impressed on two or on all three phases of the medium voltage network by D.C. loading such two, or three, or more transformers at the same time; the D.C. flux is generated in one limb of one transformer, in a second limb of a second transformer, in a third limb of a third transformer, and any further transformers so loaded will reinforce the effect of loading one or other of the first three.

The invention will be further described by way of example with reference to the accompanying drawings, in which:

FIG. 19 is a block schematic circuit diagram of a receiver responsive to pulses at a single predetermined phase angle;

FIG. 20 is a block schematic circuit diagram of a receiver responsive to pulses at a single predetermined phase angle and incorporating counter-type signal code discrimination;

FIG. 21 is a block schematic circuit diagram of a receiver responsive to pulses at each of two predetermined phase angles;

FIG. 22 is a block schematic circuit diagram of a double phase angle receiver responsive to pulses at each of two predetermined phase angles and incorporating counter-type signal code discrimination;

Figure 24:
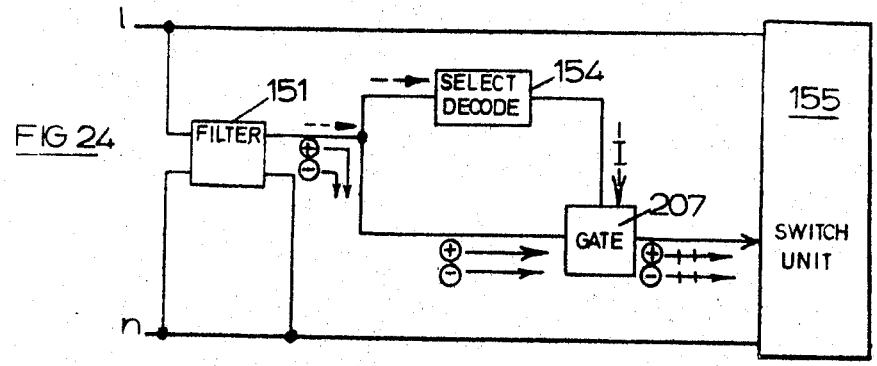
Figure 25:
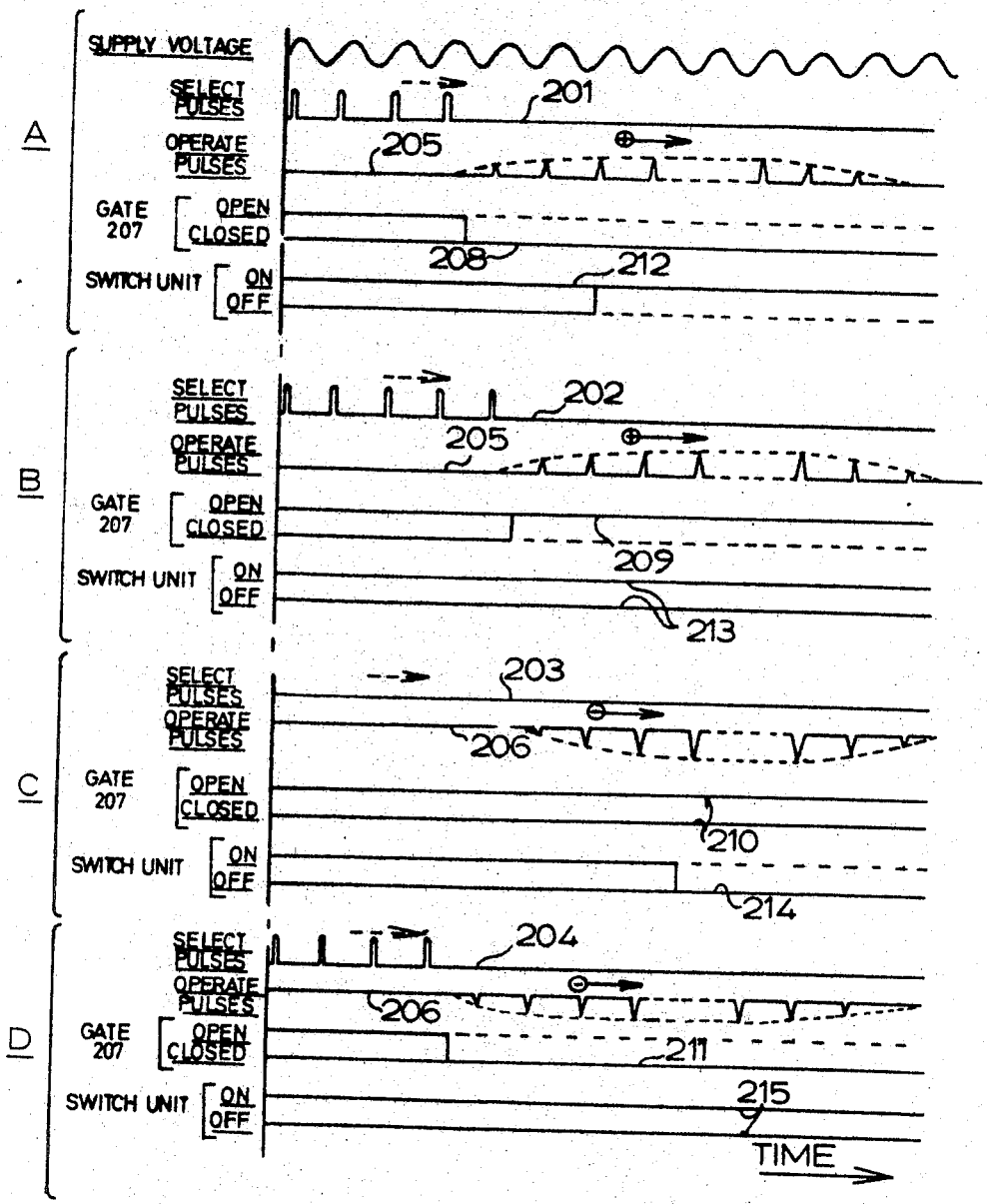
Figure 26:
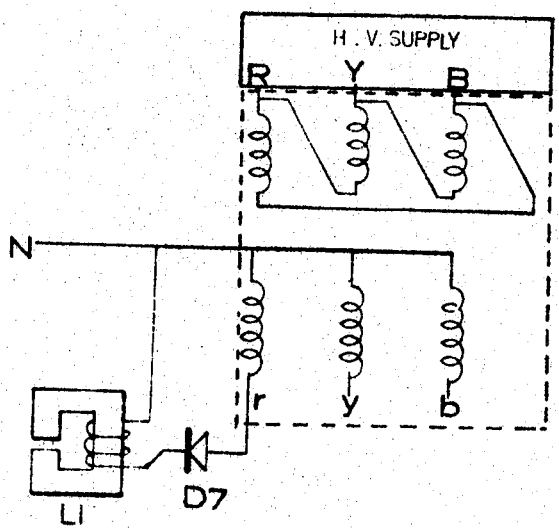
Figure 29:
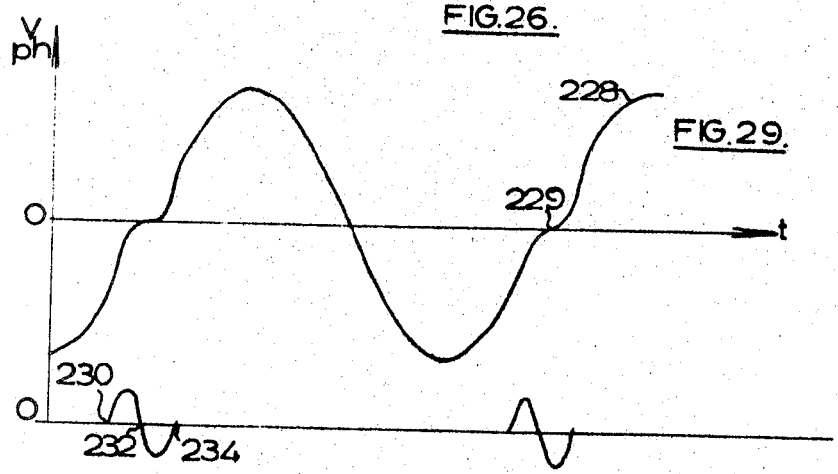
Figure 31:
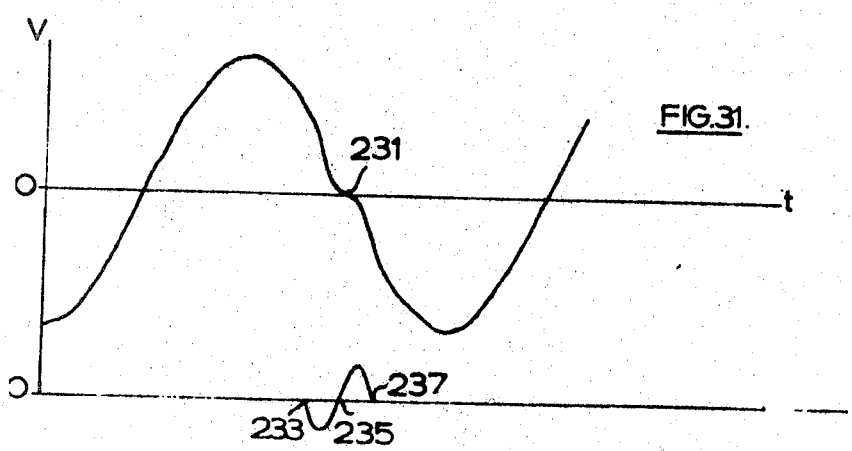
Figure 27:
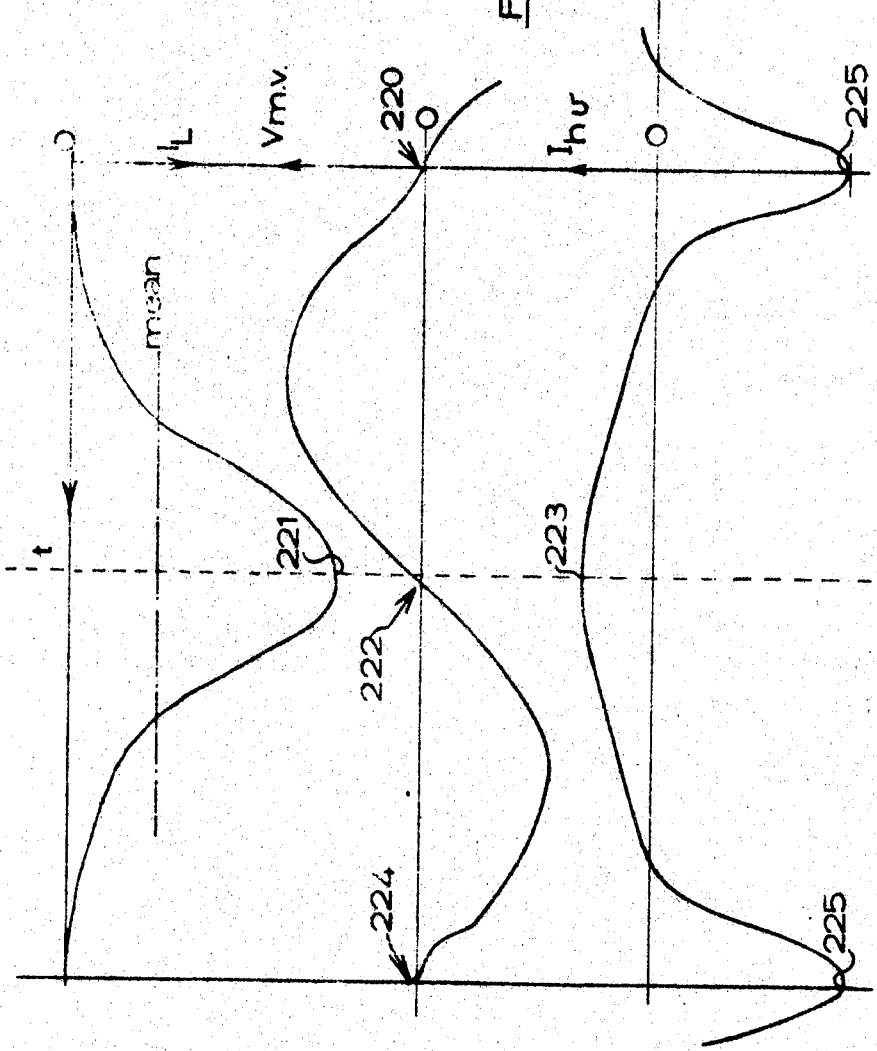
Figure 28:
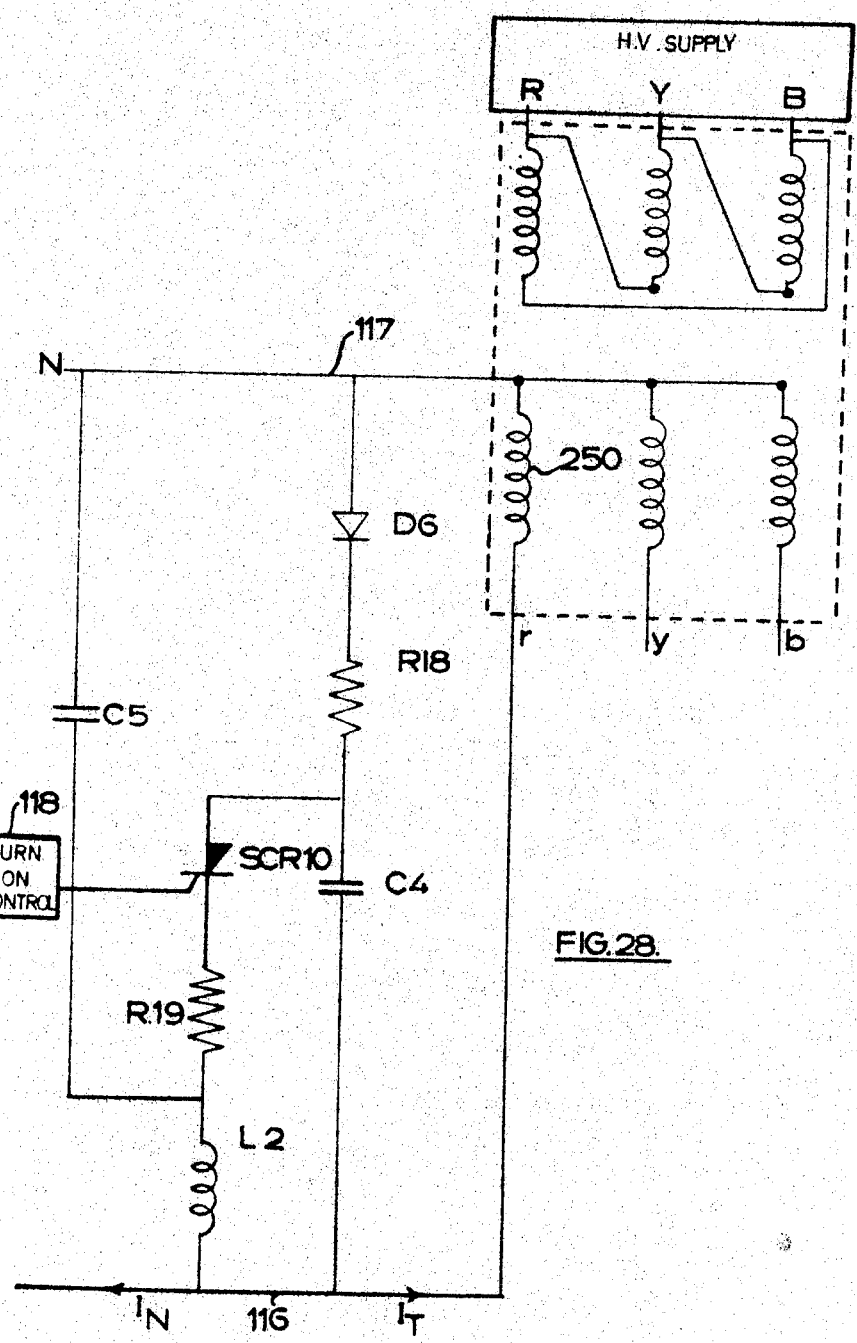
Figure 30:
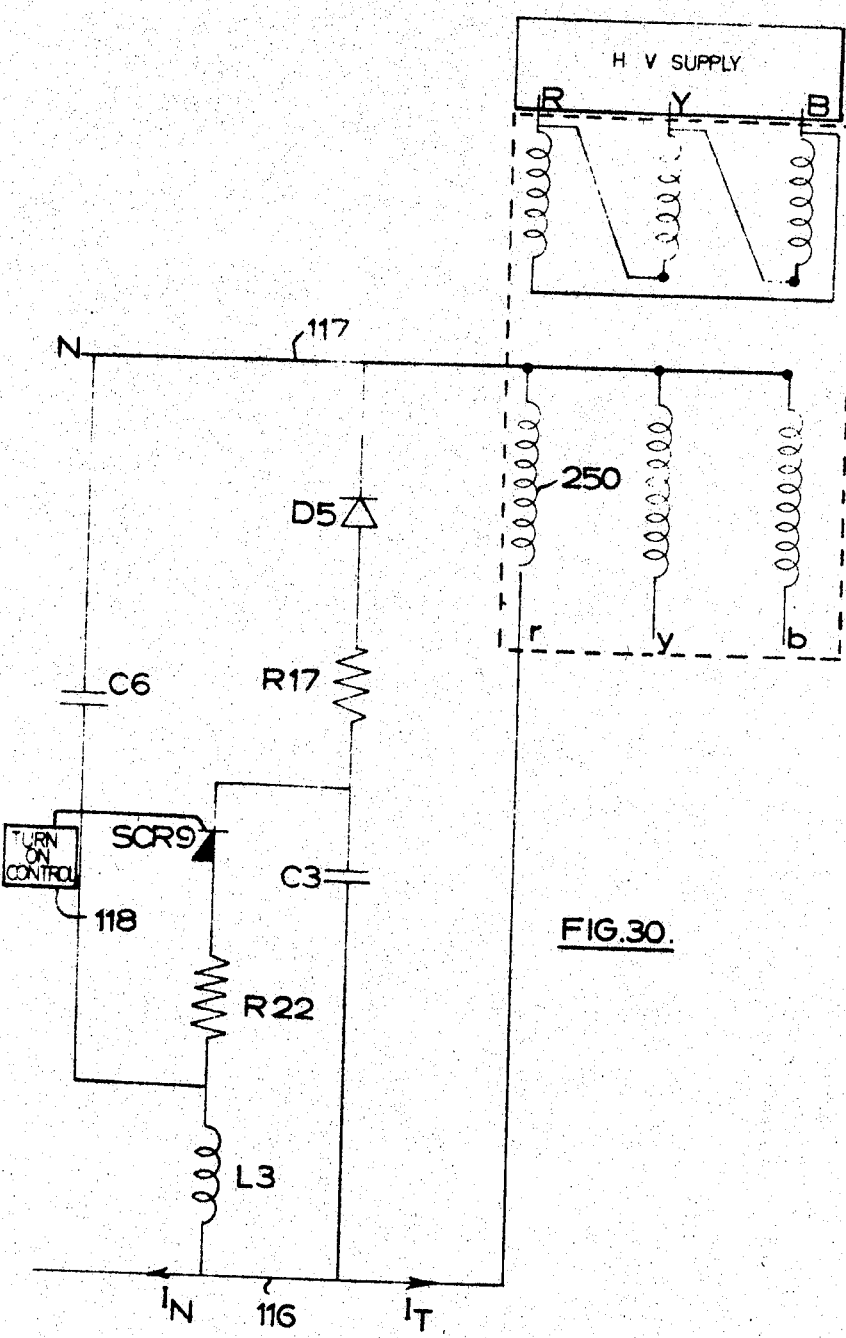
Figure 32:
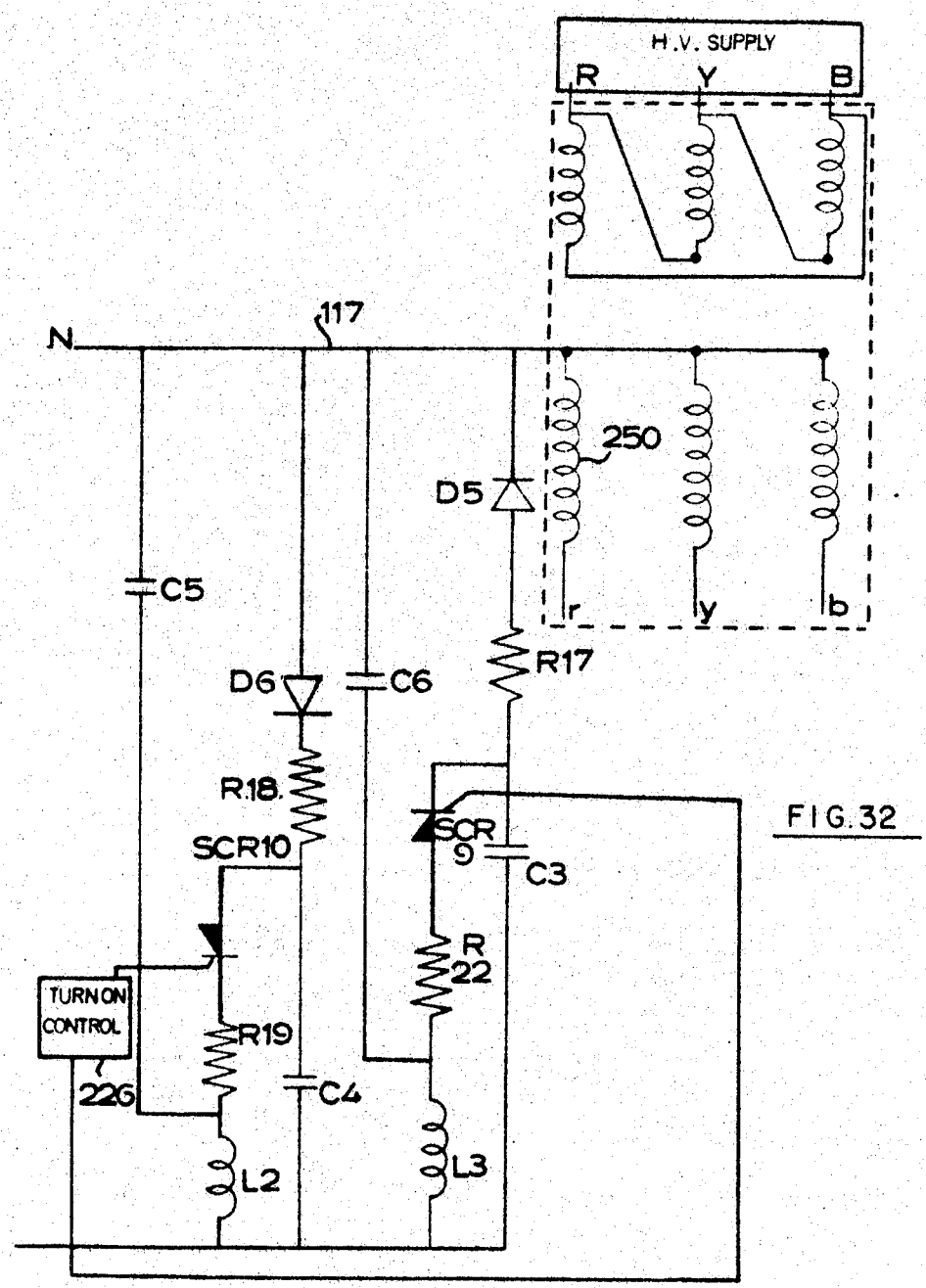

IFG. 23 is a block schematic circuit diagram with a receiver responsive to pulses at each of two predetermined phase angles and incorporating counter-type signal checking;

FIG. 24 illustrates parts of a timing diagram to indicate coded signals generated by using both transformer D.C. loading and capacitor injection methods and also illustrates the response of a code responsive receiver to them;

FIG. 25 is a block schematic circuit diagram of a code responsive receiver responsive to signals of the type shown in FIG. 24;

FIG. 26 is a circuit diagram of an alternative arrangement of a three-phase transformer arranged for pulse signal generation principally on one phase;

FIG. 27 is an oscillogram depicting current and voltage wave-forms associated with the arrangement of FIG. 26;

FIG. 28 is a circuit diagram of an alternative arrangement of a capacitor type of injector adapted for injecting pulses during a crossover of the voltage impressed on the line from negative to positive;

FIG. 29 is an oscillogram depicting the voltage wave-form associated with the arrangement of FIG. 28;

FIG. 30 is a circuit diagram of an injector similar to that shown in FIG. 28 but which is adapted for injecting pulses during a crossover of the voltage impressed on the line from positive to negative;

FIG. 31 is an oscillogram depicting the voltage wave-form associated with the arrangement of FIG. 28; and FIG. 32 is a circuit diagram of an injector similar to that shown in FIGS. 28 and 30 but which is adapted for injecting pulses during crossovers from both negative to positive, and positive to negative of the voltage impressed on the line.

Figure 1:
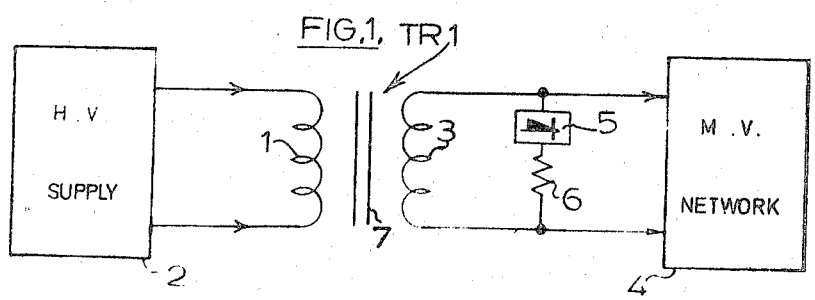
FIG. 1 is a schematic drawing of a single-phase power transformer arranged to generate pulse signals onto an A.C. supply system, by transformer D.C. loading.
Figure 2:
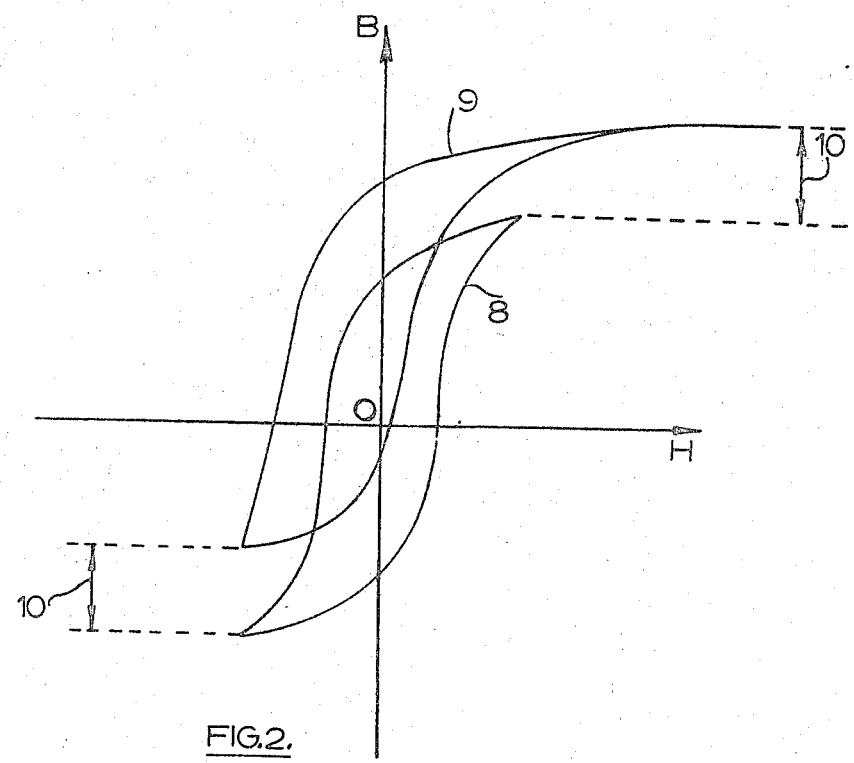
FIG. 2 shows typical $B:H$ curves for the magnetic circuit of a transformer both operating normally and during pulse signal generation.

The circuit diagram of FIG. 1 illustrates one manner in which pulse signals can be generated on a voltage impressed on a distribution network by means of a sub-station transformer. A signal-phase transformer TRI has its primary winding 1 connected to a higher voltage power supply 2 and through its secondary winding 3 delivers power to a lower or medium voltage distribution network 4. Rectifying means 5 in a series with a limiting resistor 6 are connected across the secondary winding 3. The effect of such a rectifying circuit is to cause a large unidirectional current to be drawn from the secondary 3 of the transformer TRI which, if it is sufficiently large for the transformer core 7 to be saturated during part of one half cycle will modify the $B:H$ curves for the transformer magnetic circuit in the manner shown in FIG. 2 where the one curve 8 represents a transformer working normally and the other curve 9 represents a transformer with a large unidirectional component of current flowing through its secondary. This distortion of the $B:H$ curve results in a distortion of the secondary output voltage and the primary current. The difference 10 between the maximum values of B in each direction is equal to the magnitude of the unidirectional flux density in the core.

Figure 3:
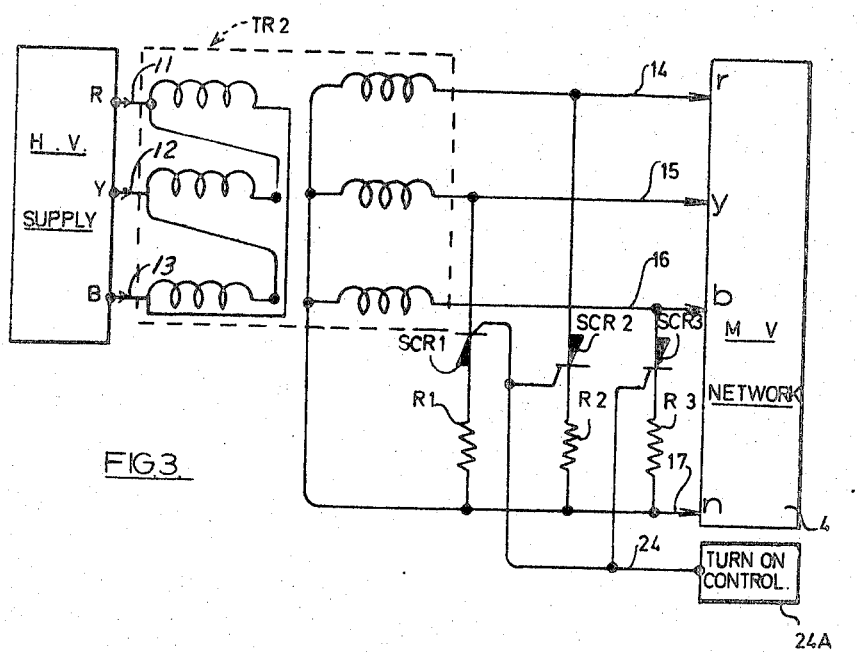
FIG. 3 is a circuit diagram of a three phase transformer arranged for pulse signal generation principally on one phase.
Figure 4:
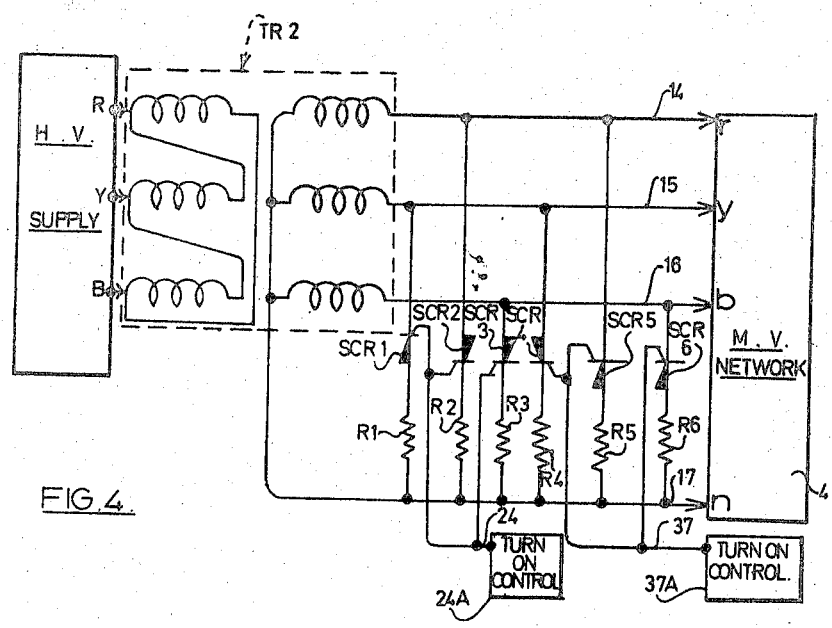
FIG. 4 is a circuit diagram of a three phase transformer arranged for pulse signal generation on one phase only as its voltage passes through zero either from a positive to a negative value or from a negative to a positive value.
Figure 5:
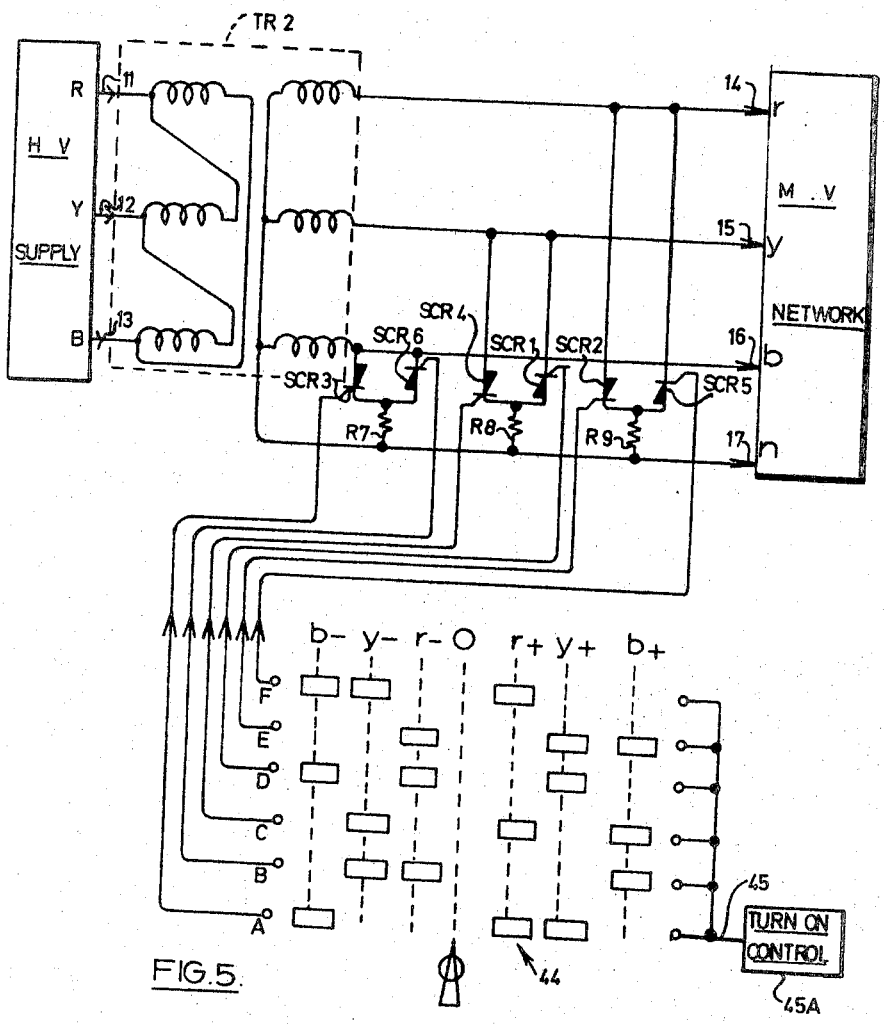
FIG. 5 is a circuit diagram of a modification of the arrangement of FIG. 4 to permit pulse signal generation on any selected one phase.

In the case of a three phase transformer with a three limb core, pulse signal generation on one phase by saturating the corresponding limb of the transformer core will not be apparent on the other two phases since the flux passing through that limb must be equally divided between the other two limbs and will not therefore be sufficient to saturate them. A circuit arrangement suitable for pulse signal generation principally on one phase of a three phase transformer TR2 is illustrated in FIG. 3, where line 12 is connected to the yellow phase of the high tension supply (denoted by the reference Y), line 13 is connected to the blue phase (denoted by the reference B), and line 11 is connected to the red phase (denoted by the reference R). Lines 14, 15 and 16 are connected to the red, yellow and blue phases respectively of the secondary or medium voltage network (denoted respectively by the references r, y and b). The rectifying devices employed are silicon controlled rectifiers SCR1, SCR2, SCR3 connected so that the unidirectional flux in the red and blue limbs of the transformer core is combined in the yellow limb of the transformer core, each limb being identified for the sake of convenience with reference to the phase of the secondary winding thereon. Consequently the pulse signals are generated principally on the yellow phase y. Neutral line 17 (denoted by the reference n) is connected to the neutral point of the transformer secondary and line 24 is connected to a "turn-on" control 24A for the silicon controlled rectifiers. Resistors R1, R2 and R3 are safety current limiting resistors. Since the major distortion of the output waveform will occur as the flux reaches a maximum in the one direction but not when it reaches a maximum in the other direction, the output pulse signal will only be generated as the voltage impressed on the medium voltage yellow phase y passes through zero in the one direction, and not when it passes through zero in the other direction. An arrangement such as that shown in FIG. 3 may readily be combined with a similar circuit arrangement with the polarity of the rectifying devices SCR4, SCR5 and SCR6, reversed as shown in FIG. 4, and associated with a separate "turn-on" control 37A and in series with limiting resistors R4, R5, R6, so as to provide pulse signal generation in the yellow phase as the voltage impressed thereon passes through zero in the opposite direction. It is also apparent that such rectifying devices, together with a "turn-on" control 45A and a multi-position control switch, could be arranged to provide pulse signal generation on any one of the phases r, y, b, as the voltage impressed thereon passes through zero in either direction, as required. FIG. 5 shows a suitable arrangement employing a seven-position, six-pole control switch 44 where positions of the switch denote r+, y+, b+ permit pulse signal generation on the red, yellow and blue phases, r, y, b, respectively, as the voltage impressed thereon passes through zero in the one direction, and positions r—, y—, b— represent pulse signal generation on the red, yellow and blue phased r, y, b, respectively as the voltage impressed thereon passes through zero in the other direction, position 0 represents the off position. Neutral line 17 is the neutral wire connection of the transformer secondary. Lines 14, 15 and 16 are the connections to the red, yellow and blue phases of the transformer secondary respectively and line 45 is connected to a "turn-on" control 45A for the silicon controlled rectifiers. It is not necessary to provide limiting resistors individual to each rectifying device as in FIG. 4 and one such resistor can be common to the two rectifying devices connected to the same phase line, i.e. resistors R7, R8 or R9 are common to rectifying devices SCR3 and SCR6, SCR4 and SCR1, and SCR2 and SCR5 respectively. Although silicon controlled rectifiers have been employed as the rectifying devices, any asymmetrical device with the addition of a series switch means might be employed, although it might not be as convenient or efficient as a silicon controlled rectifier.

Other alternative methods of applying D.C. flux components are available. For example D.C. flux down the red limb of the transformer and up the yellow limb, down the yellow limb and up the blue limb, down the blue limb and up the red limb and the same three arrangements, but with the direction of the D.C. flux component reversed.

Figure 6A:
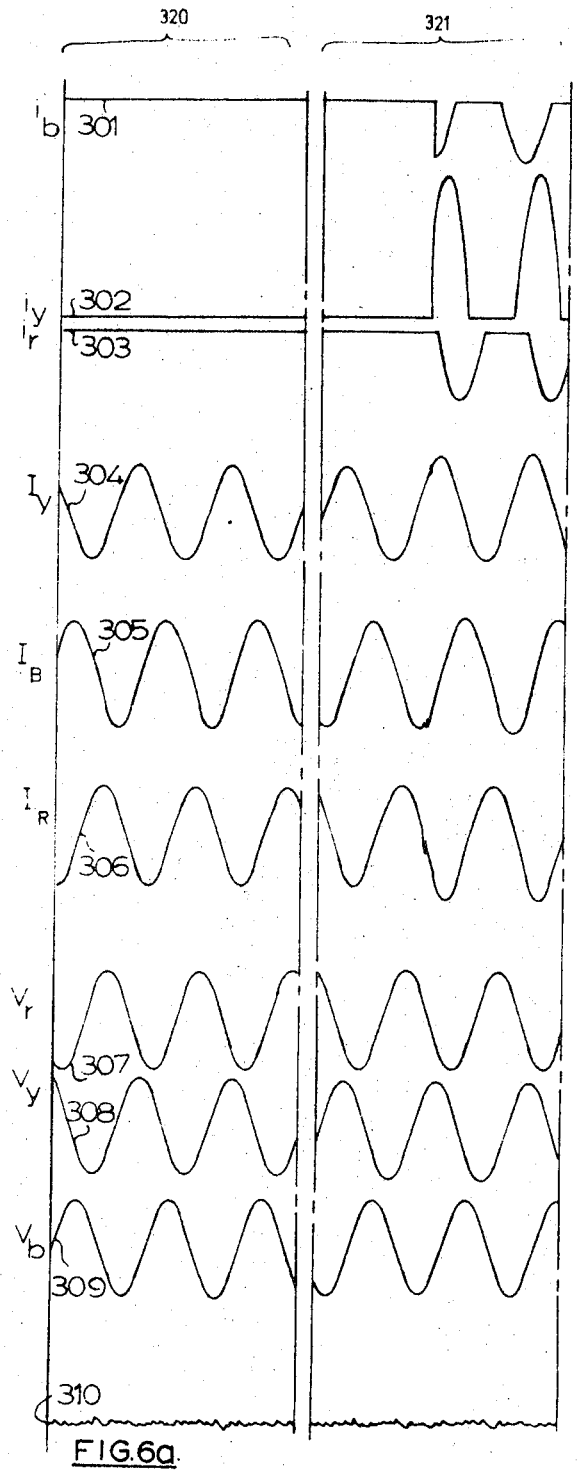
FIG. 6 (comprising FIGS. 6a, 6b and 6c) shows parts of an oscillogram depicting current and voltage wave-forms asociated with the arrangement of FIG. 3.
Figure 6B:
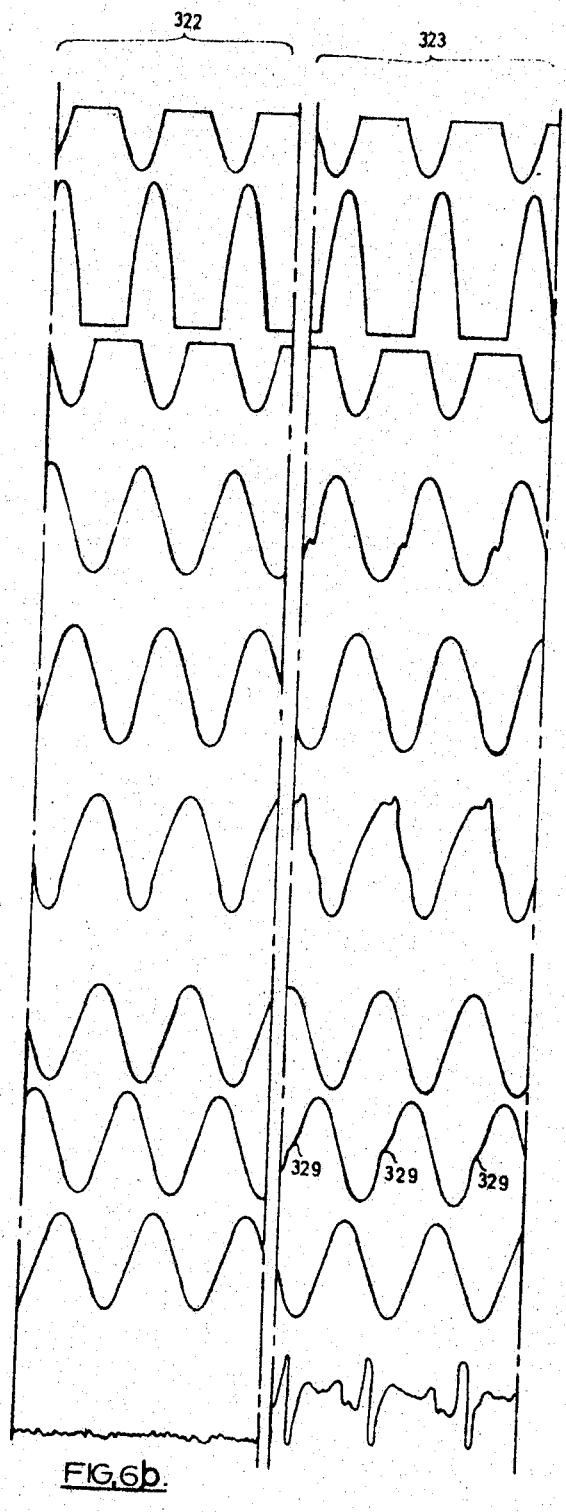
Figure 6C:
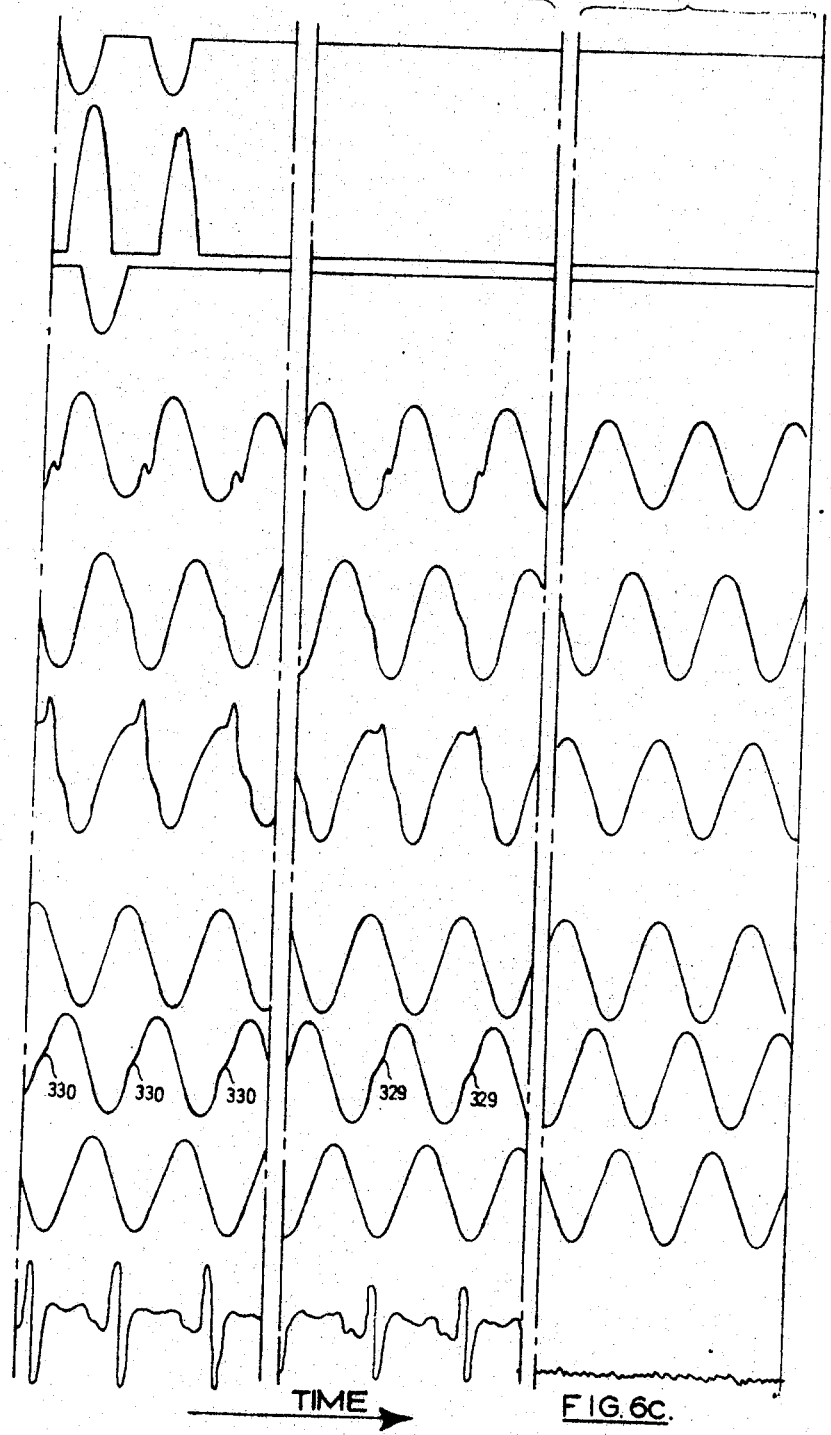

The waveforms observed in the operation of the arrangement shown in FIG. 3 are illustrated in FIG. 6, where waveforms 301, 302, 303 represent the currents passed by the rectifiers SCR3, SCR1, SCR2 connected to the blue, yellow and red phases b, y, r of the transformer secondary respectively. The waveforms 304, 305, 306 represent the current drawn by the yellow, blue and red phases respectively from the high tension supply lines 12, 13, 11 and designated $I_Y$, $I_B$, $I_R$, respectively. Waveforms 307, 308, 309 show the voltage waveforms on the red, yellow and blue phases r, y, b, respectively of the medium voltage side of the transformer designated Vr, Vy, and Vb respectively and waveform 310 shows the output obtained from a filter connected between the yellow phase y and neutral n at a remote point in the distribution system. The waveforms have been drawn in the form of samples taken at different times before, during and after pulse signal generation. Sample 320 was taken prior to the pulse signal generation, sample 321 was taken at the moment of switching on the system, sample 322 was taken 1 second after switch on, sample 323 was taken 5 seconds after switch on, sample 324 was taken 15 seconds after switch on, and includes the moment of switch off, sample 325 was taken 2 seconds after switch off, and sample 326 was taken 5 seconds after switch off.

It should be noted that saturation of one of the limbs of the transformer required a finite time to be completed and is only just complete 15 seconds after switch on in the samples shown. Furthermore, since the primary of the transformer is delta-connected, the current waveform abnormalities on the high tension side of the transformer occur on the yellow and red phases Y and R. The discontinuities 329, 330 in the yellow phase medium voltage waveform are relatively insignificant and have been exaggerated at 329, 330 in order to show their general form.

Figure 7:
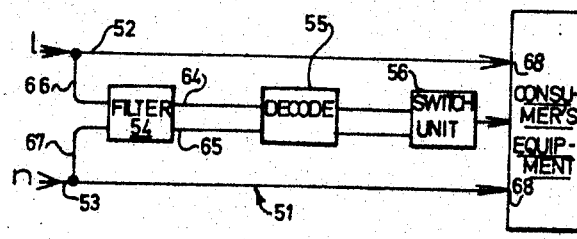
FIG. 7 is a block schematic diagram of a generalized receiver.
Figure 8:
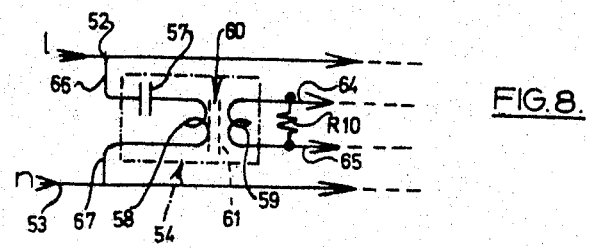
FIG. 8 is a circuit diagram of a filter suitable for use in the receiver of FIG. 7 and having a dust core transformer.
Figure 9:
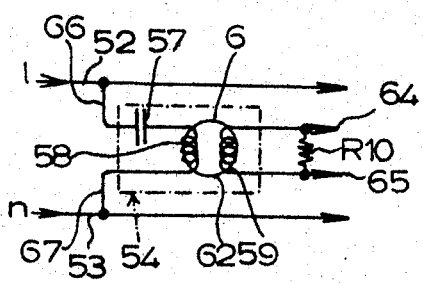
FIG. 9 is a circuit diagram of another filter suitable for use in the receiver of FIG. 7 and having a toroidal core transformer.

Signals on a distribtuion network may be detected by a receiver 51 of the general type illustrated in FIG. 7 connected between the appropriate phase and neutral lines 52, 53, and denoted respectively by the references l and n. The first stage of the receiver comprises a simple high pass filter 54 followed by a decoding circuit 55 and a switch unit 56 which provides the output. A suitable filter 54 comprises a capacitor 57 and transformer primary 58 connected in series between the line and neutral wires 52 and 53, the output of the filter being taken from the secondary 59 of the transformer 60. Such a transformer 60 might have a dust-core 61 or a toroidal non-magnetic core 62, as shown in FIGS. 8 and 9 respectively. A damping resistor R10 is preferably connected across the output leads 64 and 65 of the filter 54. The input circuit of the filter forms a series-tuned circuit which is preferably tuned to about 500 c./s. to detect pulses generated by transformer D.C. loading and about 40 to 100 kc./s. to detect pulses generated by capacitor type injection. For the lower frequency range, ferrite cores rather than dust- or air-cores have been found suitable.

In FIG. 7 leads 66, 67 are connected to the supply and the wires continue at 68 to the consumer's mains equipment.

Figure 10:
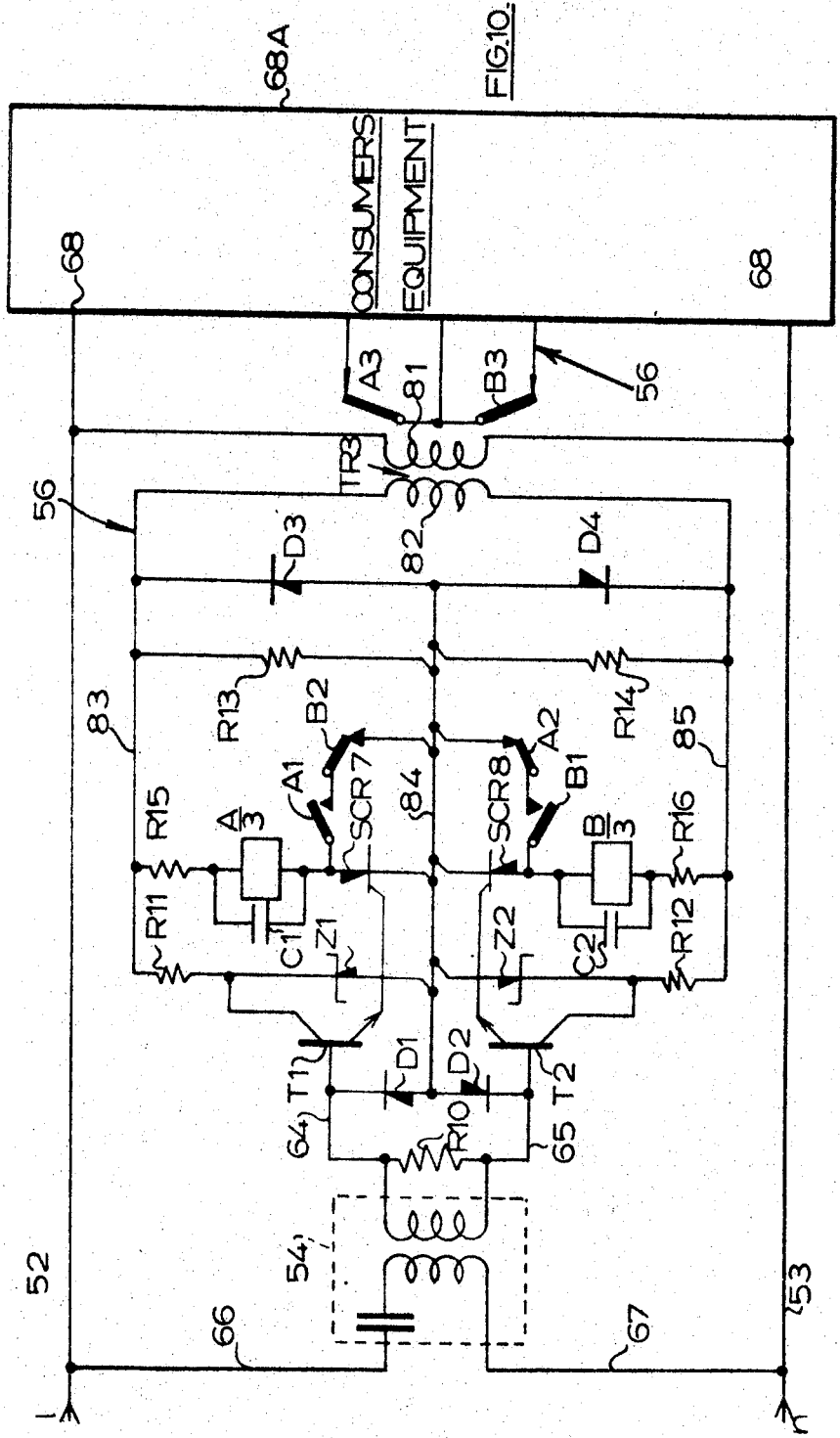
FIG. 10 is a circuit diagram of one form of receiver.

A circuit diagram of a suitable form of receiver is shown schematically in FIG. 10. The receiver illustrated is adapted to receive and distinguish between positive and negative going pulses of the correct phasing. The phase-reference voltage (derived in this case directly from the supply) is connected to the primary winding 81 of the transformer TR3. Rectifiers D3, D4 and resistors R13, R14 are connected in series-parallel across the secondary winding 82 of the transformer TR3 so as to provide an unsmoothed half-wave power supply on leads 83, 85 where the voltage varies between zero and a positive value relative to the lead 84, and the positive voltage excursion on lead 83 is 180° out of phase with the voltage on lead 85. Relay A, shunted by capacitor C1, is connected in series with a resistor R15 and a silicon controlled rectifier SCR7 which is connected in parallel with relay contacts A1, B2. The control electrode of silicon controlled rectifier SCR7 is connected to the emitter of transistor T1. The collector of transistor T1 is connected to the junction between one end of resistor R11 and the positive termination of Zener diode Z1 while the other end of resistor R11 is connected to lead 83 and the negative termination of Zener diode Z1 is connected to lead 84. The base of transistor T1 is connected by lead 64 to diode D1, one output termination of filter 54, and one end of resistor R10. Relay B, shunted by capacitor C2, is connected in series with a resistor R16 and a silicon controlled rectifier SCR8 which is connected in parallel with relay contacts A2, B1. The control electrode of silicon controlled rectifier SCR8 is connected to the emitter of transistor T2. The collector of transistor T2 is connected to the junction between one end of resistor R12 and the positive termination of Zener diode Z2 while the other end of resistor R12 is connected to lead 85 and the negative termination of Zener diode Z2 is connected to lead 84. The base of transistor T2 is connected by lead 65 to diode D2, another output termination of filter 54, and the other end of resistor R10. Diodes D1, D2 are connected in series opposition with lead 84 being connected to the junction between them, so that pulses of opposite polarity from said filter 54 will be fed to the base of either transistor T1, or transistor T2, as a positive-going pulse (relative to lead 84). The input leads of filter 54 are connected between the line and neutral leads of the phase on which a signal is to be detected. A positive-going pulse of sufficient amplitude applied to the base of either transistor T1, or transistor T2, will turn it on (provided that the supply voltage on lead 83, or lead 85, is sufficient) and, in turn, trigger a silicon controlled rectifier SCR7, or a silicon controlled rectifier SCR8, respectively. The capacitors C1, C2, shunting the relays A, B, and the series resistors R15, R16, combine to "slug" the relays A, B, making them slow-operate, slow-release. Consequently the relays A, B, will not operate on a single pulse, but integrate the pulses of current through the silicon controlled rectifiers SCR7, SCR8 and only operate when the mean current through the coils of the relays A, B, is high enough. The mean current rises as the silicon controlled rectifiers SCR7, SCR8 are triggered at an earlier time during the positive voltage excursions on leads 83, 85. Relay A, having been operated, will hold over its own make contact A1 and may be released by a "break" contact B2 when relay B operates. Relay B, when it is operated, will hold over its own "make" contact B1 and may be released by a "break" contact A2 when relay A operates. Consequently, a train of pulses of one polarity and of correct phase relationship with the supply will cause one or other of the relays to operate and hold over its own contact, said one relay being released when a train of pulses of the opposite polarity, and also of correct phase relationship with the supply, cause the said other relay to operate, thus breaking the hold circuit of the said one relay. A break contact A3, B3 on each of the relays may be connected to control a consumer's equipment. In one practical form of the receiver, it has been found that a pulse should occur between 5° and 20° after the supply waveform has passed through zero. If a different phase relationship between the signal pulse and the mains waveform is required, then phase shifting means must be interposed between the supply (which acts as a phase reference source) and transformer TR3.

Figure 11:
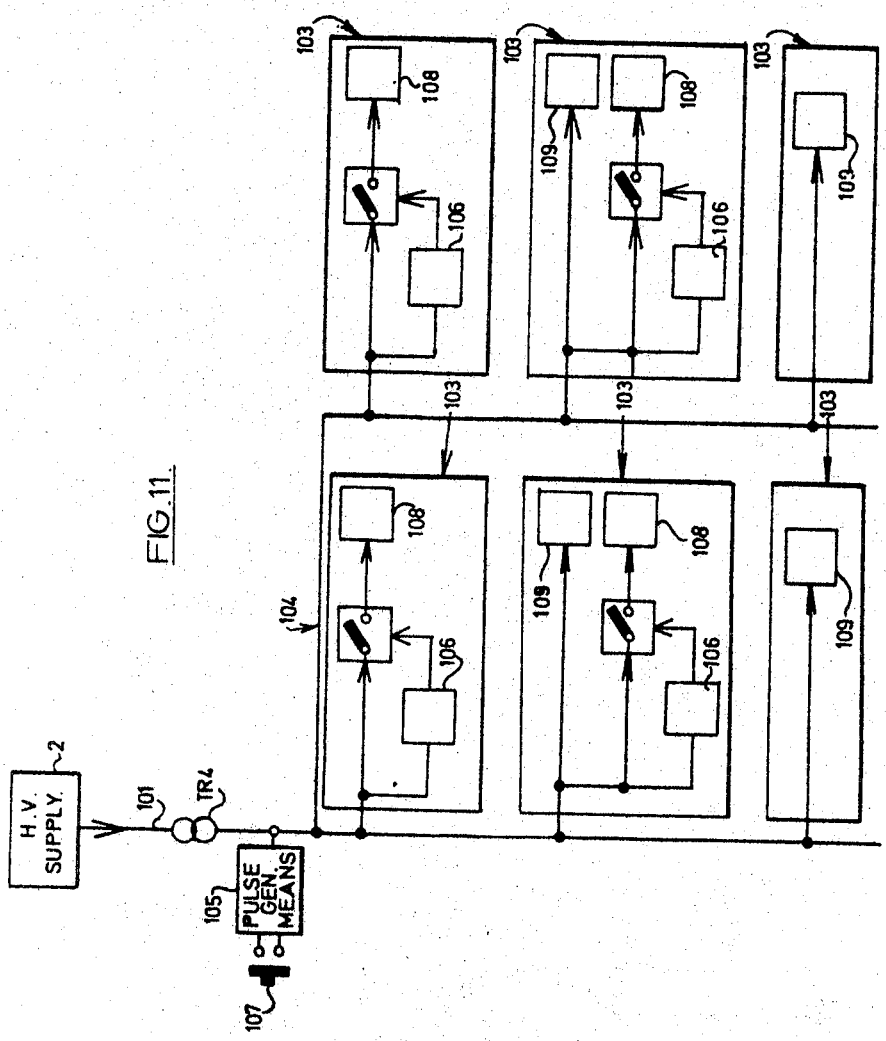
FIG. 11 is a block schematic diagram of parts of a medium voltage local distribution network to which the system of the present invention is applied.

Injection and receiving devices of the type described may be incorporated in a medium voltage local distribution network in the manner shown in FIG. 11 where the high tension supply 101 is transformed to medium voltage by the step-down transformer TR4 and distributed to consumers 103 by means of the local distribution network 104. The transformer type of pulse signal generating unit 105 is connected to the transformer TR4 in order to signal on the distribution network 104 to each of the consumers 103 with equipment 108 controlled by receiving equipment 106 when the operate-button 107 is depressed. The said consumers 103 may have additionally, or alternatively, equipment 109 which is not controlled by receiving equipment 106.

Figure 12:
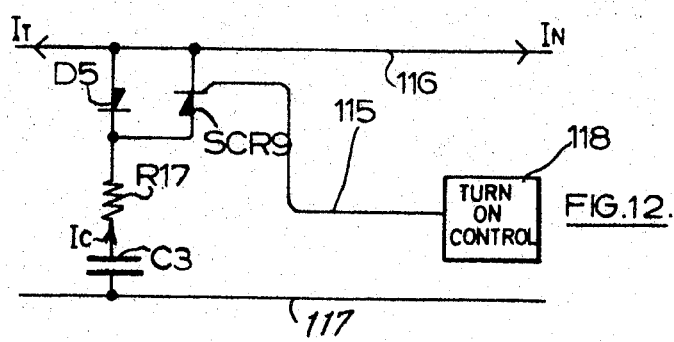
FIG. 12 is a schematic circuit diagram of a capacitor type of injector adapted for injecting pulses during a negative half cycle.
Figure 13:
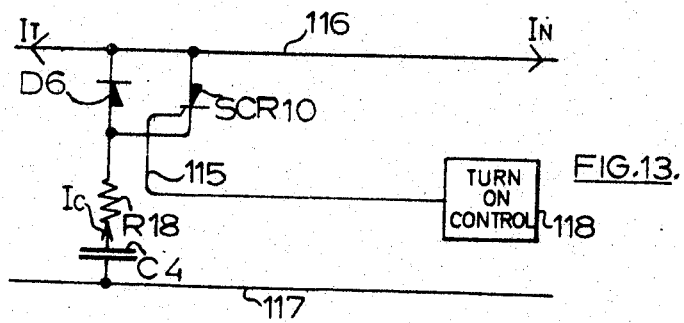
FIG. 13 is a schematic circuit diagram of the same type of injector as in FIG. 12 but adapted for injection during a positive half cycle.
Figure 14:
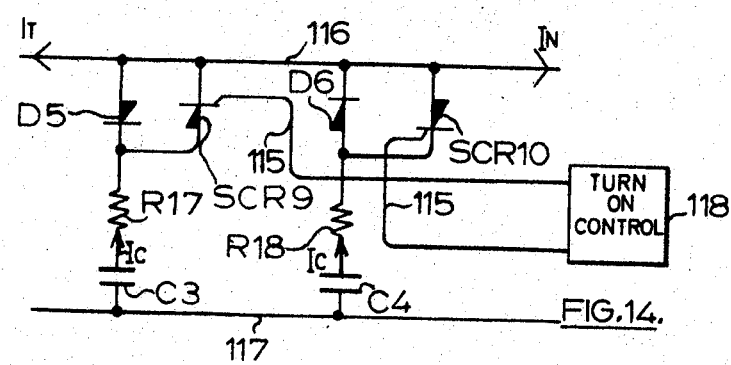
FIG. 14 is a schematic circuit diagram of a capacitor type of injector adapted for injection during either negative or positive half cycles.

It is also possible to generate signals of the required type by discharging a charged capacitor onto the mains supply network. Suitable circuits for this purpose are illustrated in FIGS. 12 and 13, which are arranged to produce a positive-going and negative-going pulse respectively. A capacitor C3, C4 charges up via limiting resistor R17, R18 and diode D5, D6, during one half-cycle of the mains voltage waveform and may be discharged during a subsequent half cycle of the voltage waveform, of opposite polarity, but turning on a silicon-controlled rectifier SCR9, SCR10 by connecting a suitable turn-on voltage via lead 115 from a turn-on control 118. Wire 116 is connected to the appropriate phase of the mains supply and wire 117 is connected to the neutral. The circuits, shown in FIGS. 12 and 13, may be connected in parallel as shown in FIG. 14, so as to permit the transmission of pulses of either polarity. Signals generated by circuits of the capacitor type are mainly propagated in the network into which they are injected, whereas signals generated by circuits of the transformer type are also propagated in the high voltage system, and so distributed to other medium-voltage local distribution networks.

Figure 16:
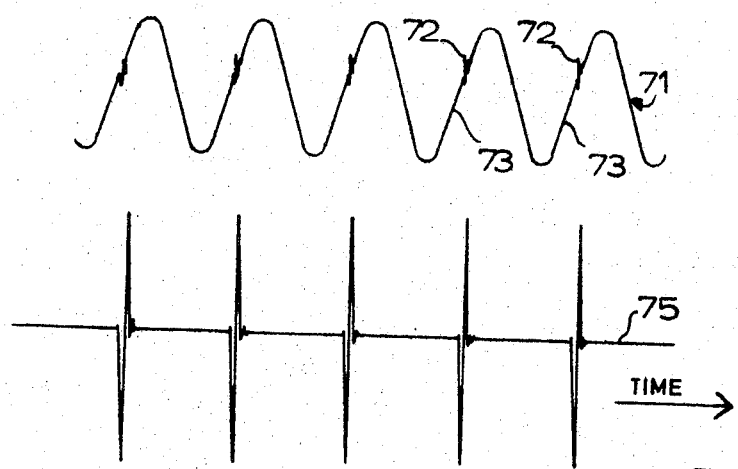
FIG. 16 shows parts of oscillograms depicting a voltage wave-form associated with the operation of the arrangement shown in FIG. 12 and also of a desired signal passed by a filter in a receiver.

The waveform 71 appearing on the mains when the pulse signals are present is typically shown in FIG. 16 where the discontinuity 72 may occur at any predetermined point in the voltage waveform. For the sake of illustration the discontinuity in FIG. 16 is shown as about 20 degrees before zero.

Figure 17:
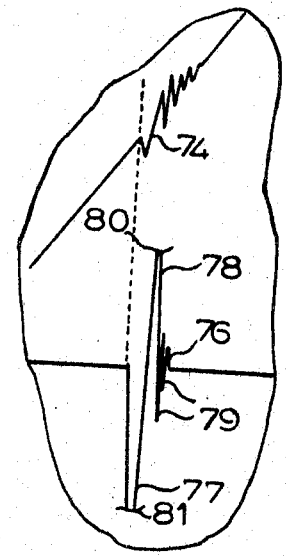
FIG. 17 is an enlarged view of a portion of the wave-forms of FIG. 16.

The general form of the discontinuity may be seen more clearly at 74 in FIG. 17. When waveform 71 is applied to a filter, an output of the type shown at 75 in FIG. 16 is obtained. Examination of an enlarged view of this waveform at 76 in FIG. 17 shows that the initial spike 77 and overshoot 78 is followed by a short ring 79. The maximum positive and negative excursions of the waveform 76 in FIG. 17 have been cut off at 80, 81. It will be noted that in FIG. 16 the voltage of the output 75 from the filter is very much greater than the voltage of a pulse input 72 and provides an adequate signal to noise ratio.

Figure 15:
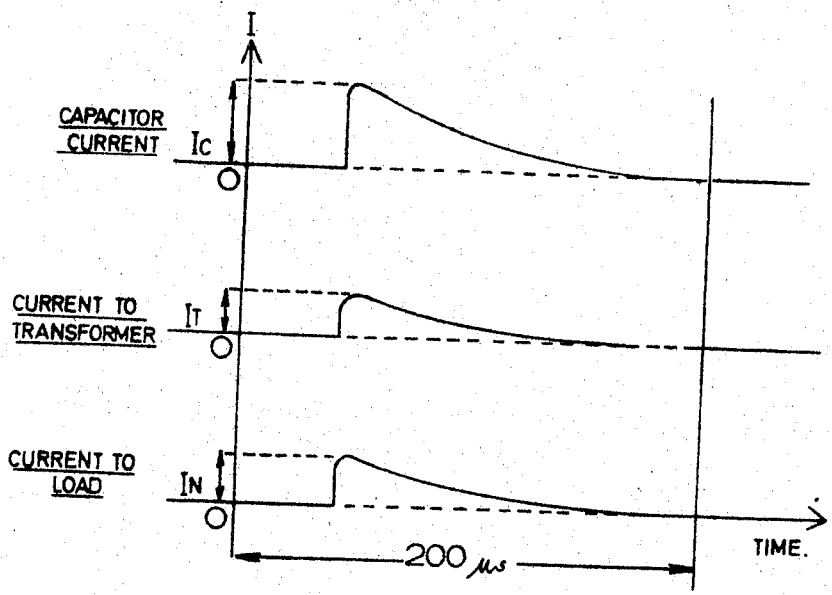
FIG. 15 shows parts of oscillograms depicting current wave-forms associated with the arrangement shown in FIG. 12.

The action of the capacitor type circuit during pulse injection is illustrated in FIG. 15 where the total current Ic from the injector may be seen to take the form of a "differential spike" falling exponentially after the initial rise with a time constant of about 70μs. The current from the capacitor divides between the transformer and the load, the current to the load $I_N$ being slightly greater than the current to the transformer $I_T$. Since the capacitor charges during one half-cycle and pulse injection occurs during a half-cycle of opposite polarity, the capacitor in fact discharges and then charges up with the opposite polarity so that the effect is momentarily to connect a very heavy shunt across the transformer. The values shown in FIG. 15 were obtained in one form of practical circuit.

The transformer type of pulse generating circuit is particularly adapted to generating pulse signals during each cycle over a period of several seconds, where the signal is intended for widespread distribution, although it is possible to at least partially suppress the signal in individual cycles. Such signal suppression might be effected by injecting energy on to the appropriate phase of the medium voltage so as to compensate for the effective reduction in energy transferred to that phase of the medium voltage system as the corresponding limb of the transformer passes into saturation. A suitable means of storing such additional energy might be in a separate magnetic circuit, or in a capacitor, which may be connected to the appropriate phase of the medium voltage supply by time controlled switching means.

Figure 18:
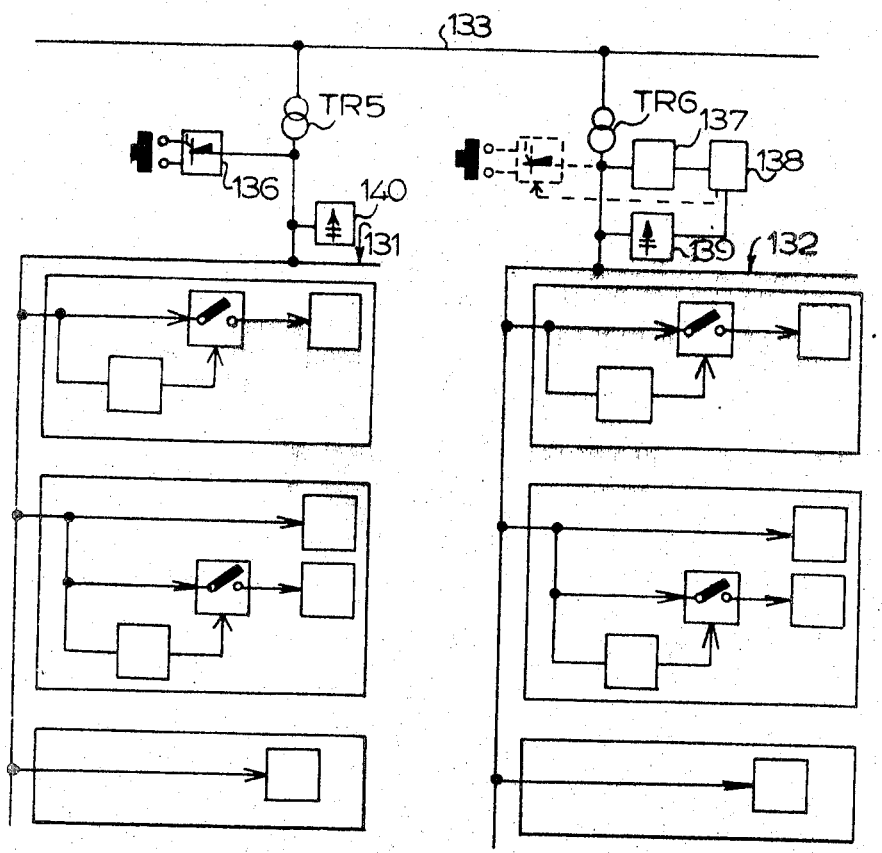
FIG. 18 is a block schematic diagram of parts of high tension and medium voltage distribution networks to which the system of the present invention is applied.

On the other hand, capacitor type injection circuits lend themselves to the generation of coded signals for distribution limited to a local network. Consequently, the two types of injection may be combined in the same system to provide various facilities. An example of this is illustrated in FIG. 18 which shows two medium voltage local distribution networks 131, 132, supplied from the same high-tension system 133 via step-down transformers TR5, TR6, respectively. A transformer type of pulse generation circuit 136 is connected to transformer TR5, and the generated pulse signals may be detected, not only in network 131, but also in network 132. A receiver 137 and switch unit 138, responsive to these signals, control a capacitor type of injection circuit 139, which will then inject coded signals into network 132: similar coded signals may be injected simultaneously into network 131 by another capacitor type of injection circuit 140. Circuit 139 might also be controllable locally. The consumers receiving units in networks 131 and 132 are only responsive to such coded signals and hence may be controlled directly locally, or indirectly from a remote point in the system. Further possibilities include receiving units responsive only to a correct combination of a transformer generated signal and a capacitor injected coded signal.

Figure 23:
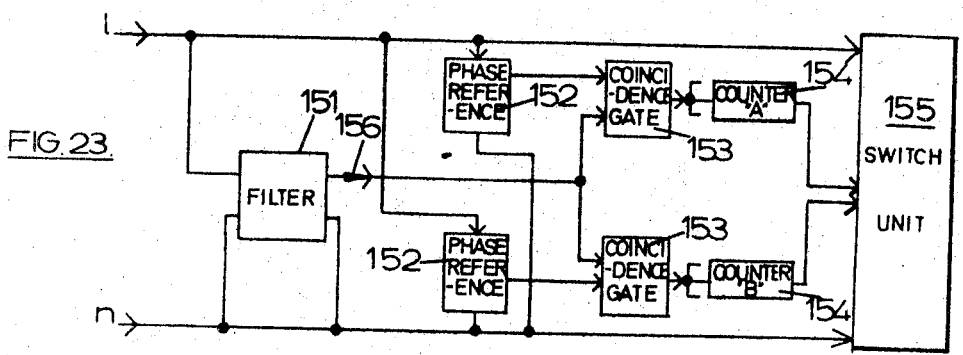

Block diagrams of a few of the possible types of receiver unit are shown in FIGS. 19 to 23. In each of these arrangements, the output 156 of a filter 151 is fed to one or more coincidence gates 153. In each coincidence gate 153, the signal is compared with a reference signal of the desired phase derived from an A.C. mains by one or more phase reference units 152. Signals of the correct phase in relation to the A.C. mains pass through the coincidence gates 153 either to a counter 154 or to an output switch unit 155. Counters 154 may be arranged to give an output after a predetermined number of pulses has been passed to them from a coincidence gate 153, within a given time, provided that the predetermined number is not exceeded. The arrangement of FIG. 19 merely detects the presence of signals of a predetermined phasing, while in FIG. 20 this is elaborated to include at least one set of two counters 154 connected to a two-state output switch unit 155, in order to detect and respond to coding of the pulses. Alternatively, FIG. 19 may be elaborated into the arrangement of FIG. 21, where at least two phase reference units 152, providing differing phase references, enable signals of at least two different phasing to be distinguished. These further elaborations may be combined into the arrangements of either FIGS. 22 or 23, where FIG. 22 provides a large number of possible signals by subclassifying according to their phasing and coding, while FIG. 23 provides for enhanced security of the system where each signal has both a different phase and a different coding.

A further mode of operation is illustrated in FIGS. 24 and 25 where waveforms 201, 202, 203, 204 represent station identification codes, waveforms 205 represent "switch on" signals and waveforms 206 represent "switch off" codes. In FIG. 24, a correct station identification code 201 opens a gate 207 as shown (in FIG. 25) by waveform 208, so that a following "switch on" signal 205 switches on the output switch unit 155. In FIG. 25b, however, an incorrect station identification code 202 closes the gate, if not already closed, as shown by waveform 209 so that "switch on" signal 205 has no effect. FIG. 25c shows that a "switch off" signal 206 takes effect when not preceded by a station identification code, whereas in FIG. 25d, a correct station identification code 204 inhibits any response to the following "switch off" code 206. Waveforms 208, 209, 210, 211 indicate the possible states of the gate 207. Similarly, waveforms 212, 213, 214, 15 indicate the possible states of the output switch unit 155.

In the arrangement shown in FIGURES 1, 3, 4 and 5, D.C. current is drawn through a rectifier and resistor in series. The use of a resistor to limit the current flowing through the rectifier in this manner, is wasteful because of the associated $I^2R$ loss. We have found equally satisfactory results may be obtained using an air cored choke in place of the resistor. An arrangement using an air cored choke is illustrated in FIGURE 26 to which reference will now be made.

A diode D7 and an air cored choke L1 are shown connected in series across the red phase winding of a power transformer connected into the distribution network. The waveforms associated with the operation of the choke are illustrated in FIG. 27. Here the current flowing through choke L1 is shown as $I_L$, the secondary red phase voltage across which the diode D7 and choke L1 are connected as $V_{mv}$, the primary current of the transformer as $I_{hv}$ and the secondary voltage crossover points are shown as 220, 222, 224.

When the voltage passes point 220 and commences to increase to a positive value, the diode D7 starts to conduct and the current IL through the diode increases to a maximum 221 at the point 222 when the secondary red phase voltage again passes through zero.

At this point energy is stored in the air gaps of the choke. After the point 222 the voltage $V_{mv}$ applied to the diode-choke circuit starts to reverse and the mechanism of the choke commences to operate in such a way that the energy stored in the choke attempts to maintain the current $I_L$ flowing in the choke, and, during the half-cycle from 222 to 224 most of the energy drawn from the distribution network into the choke is returned to the network. The current $I_L$ which is drawn through the choke is reflected into the primary (H.V.) side of the power transformer so that the peak current 221 on the secondary side of the transformer corresponds to a peak current 223 on the transformer primary side. Initially, on switching on, the transformer primary current is asymmetrical, similar to that $I_L$ shown as flowing through the diode-choke circuit, but after a period of 10 to 15 seconds the waveforms stabilise by building up a D.C. flux component in the transformer core. After this initial stabilising period the peaks of magnetizing current are drawn from the supply in such a manner as to ensure that the primary current of the power transformer becomes purely symmetrical. FIG. 27 shows such peaks 225 of magnetizing current. From the foregoing it may be seen that if the diode D7 is reversed then the polarity of any pulses generated in the system will also be reversed.

By way of example the operation of the circuit of FIG. 26 may be more clearly explained with reference to a particular set of components. With a transformer having a power rating of 500 k.v.a. delivering a nominal secondary phase to phase voltage of 440 volts the air cored choke had an iron core cross-section of approximately 2 ins. x 2 ins. (5 cms. x 5 cms.), a total distributed air gap of 8 cms. formed by eight gaps each of 1 cm., a plurality of coils distributed round the iron core of the choke and amounting in aggregate to a winding of 250 turns and a D.C. resistance of about 0.05 ohm, and had an inductance of about 10 mh. In operation, with the diode D7 operative the peak 221 of the current $I_L$ was about 300 amps and created a peak 223 primary current $I_{h.v.}$ of about 20 amps. The peak 225 of the magnetizing current was about 60 amps. At the point 222 the energy stored in the air gap of the choke amounted to approximately 450 joules.

In the arrangement shown in FIGS. 12 to 14 and the oscillograms of FIGS. 15 to 17, a capacitor discharges directly onto the line. We have found that the frequency of discharge of the capacitor has been a bit "wild" and that a bandpass frequency of about from 40 to 100 kilocycles per second was needed for the input filter 151. We have found even better results can be obtained if the discharge from the capacitor to the line is passed through a tuned circuit. This keeps the discharge in bounds and enables a lower bandpass frequency to be used in the filter circuit 54 of FIG. 7.

The circuit shown in FIG. 28 comprises the resistors, R18, R19, the capacitor C4, the diode D6, and the silicon controlled rectifier SCR10 of the circuit shown in FIG. 13 with the addition of a capacitor C5 and an inductor L2 connected between phase line 116 and neutral line 117.

The capacitor C5, the inductor L2 and the secondary winding 250 of the transformer form a series connected tuned circuit.

FIGURE 29 indicates the voltage waveform $V_{ph}$ which appears between the red terminal on the secondary side of the power transformer and the neutral of the power transformer. The circuit so described operates as follows:

During the period from 230 to 232 the neutral of the power transformer is positive with respect to the red terminal on the secondary thereof, and therefore the diode D6 conducts, thereby charging capacitor C4 through resistor R18. Sometime during the interval, between the points 232 and 234 of the voltage $V_{rn}$ a triggering impulse is applied to the silicon controlled rectifier SCR10. The energy stored in capacitor C4 is then released into the tuned circuit which comprises the secondary red phase winding of the power transformer, the inductor L2, and a capacitor C5. This arrangement can form a resonant circuit having a natural resonant frequency of about 5 kc./s. The 5 kc./s oscillation is transmitted from the point of generation into the high voltage H.V. system and may be detected on the medium voltage network at other power transformers connected into the same H.V. system. The circuit illustrated in FIGURE 28 is capable of introducing the distortion shown at 229 into the waveform 228 indicated in FIGURE 29, where the voltage impressed upon the system is distorted as it passes through zero point 229 from a negative value to a positive value.

The pulse created in the voltage impressed between lines 116 and 117 is effectively unidirectional even though it may appear as a sine wave. The pulse has a definite polarity relationship with the waveform of the impressed voltage and as can be seen from the oscillogram illustrated in FIG. 29 the pulse starts as the impressed voltage is crossing zero from negative to positive and the pulse has an initial positive-going wave front. It will be noted that the actual resultant voltage across the lines only crosses zero once on each occasion a pulse is created. It may be argued that the decay of the pulse is offset by the rise of the impressed voltage across the lines.

The circuit illustrated in FIG. 30 is similarly a modification of that of FIG. 12. In addition to the capacitor C3, the resistors R17 and R22, the diode D5 and the silicon controlled rectifier SCR9, and inductor L3 and a further capacitor C6 are connected between lines 116 and 117 and form a series-connected tuned circuit with the transformer secondary winding 250. An oscillogram showing operation of this circuit is illustrated in FIG. 31. Again the pulse has a definite polarity relationship with the waveform of the impressed voltage, but it is the reverse of that obtained with the circuit of FIG. 28. The pulse starts as the impressed voltage is crossing zero from positive to negative and has an initial negative-going wave front. The resultant voltage across the lines only crosses zero once on each occasion a pulse is created. Such a pulse can be regarded as unidirectional even though it may appear as a sine wave.

The circuits of FIGS. 28 and 30 can, of course, be combined so that pulses of either polarity can be created. FIG. 32 shows a circuit which is capable of introducing both the aforementioned types of pulses into the voltage waveform. This circuit comprises all the circuit elements which feature in FIGS. 28 and 30. The left-hand half of the figure corresponds to FIG. 28 and is capable of introducing the waveforms shown in FIG. 29 and the right-hand half of the figure is similar to FIG. 30 and is capable of introducing the waveforms shown in FIG. 31.

Whereas with the circuits of FIGS. 12 to 14 each pulse was created approximately in the range of 0 to 20° in a positive half-cycle of the voltage impressed across the lines 116, 117 as shown in the oscillograms illustrated in FIGS. 15, 16 and 17, the circuits of FIGS. 28, 30 and 32 create each pulse substantially as the voltage impressed across the lines crosses zero. The detector of which a circuit diagram is shown in FIG. 10 is particularly suitable for detecting the pulses created by the circuits of FIGS. 12 and 14 but can be readily and easily adapted to detect the pulse created by the circuit arangements of FIGS. 28, 30 and 32. In the detector of FIG. 10 the transistor T1 or T2 will only conduct if a signal is applied to its base at the same time as a positive voltage is applied to its collector. The voltage applied to the collector of one of these transistors serves as a phase discriminator signal and it is only necessary to ensure that such signal is applied at the appropriate part of a cycle of the voltage impressed across the lines. In the circuit of the detector of FIG. 10 the voltages applied to the collectors of the transistors T1 and T2 are derived from the voltage across the lines by means of transformer TR3 and are applied respectively during the range of 0 to 20° of the appropriate half cycle of the voltage impressed across the lines 116, 117. By connecting the transformer TR3 to another source of alternating current at the same frequency as that of the voltage impressed across the lines, but phase displaced relatively thereto the detector of FIG. 10 can be arranged to respond to any desired phase relationship of pulses to the impressed voltage: this can be readily effected, for example, by connecting the transformer TR3 to the lines through a phase-shifting circuit or device.

In this specification and in the claims thereof the expression unidirectional pulse has been used. Each pulse when divorced from the waveform on which it is superimposed may be wholly of one predetermined polarity or may include a portion or portions of the opposite polarity but in any case the waveform of each pulse in a series has an initial wave front of the same polarity. The term unidirectional pulse is to be understood as including both types of pulses.

We claim:

1. A system of transmitting and receiving intelligence or control information over an alternating current power supply distribution network, which comprises means at one location on the network for creating in a voltage impressed on the network at least one uni-directional pulse, said at least one pulse occurring at a predetermined point in a cycle of said voltage, and, at at least one other location on the network, receiving means for detecting said pulse.

2. An alternating current power supply distribution network including at least one source of generation, at least one high voltage distribution network connected to said source of generation, at least one medium voltage network, at least one transformer connecting said high voltage network to said medium voltage network, at least one power consuming appliance connected to said medium voltage network at a point remote from said transformer at least on means for creating in a voltage impressed on said network at least one uni-directional pulse, each pulse occurring at a predetermined point in a cycle of voltage impressed on said network pulses and connected to said medium voltage network adjacent said transformer for transmitting intelligence or control information over said network, at least one detector connected to said medium voltage network adjacent said power consuming device for receiving said intelligence or control information over said medium voltage network, and switching means responsive to said detector for performing a control function associated with said power consuming device, 3. A system of transmitting and receiving intelligence or control information over an alternating current power supply distribution network, which comprises means at one location on the network for creating in a voltage impressed on the network a series of time-spaced uni-directional pulses, each pulse occurring at a predetermined point in a different cycle of said voltage, and, at at least one other location on the network, frequency-sensitive receiving means for detecting said pulses at said predetermined point in a different cycle of said voltage.

4. A system as claimed in claim 3 in which the pulses created extend over several seconds.

5. A system as claimed in claim 3 in which the pulses extend over one second or less.

6. A system as claimed in claim 3 including means for varying selectively the point in a cycle at which a pulse occurs and in which said receiving means includes phase discriminating means for detecting the phase of pulses relatively to a cycle of the impressed voltage and determining which of two or more output signals is to be provided.

7. A system as claimed in claim 3, in which the pulses in a series are split into two or more groups, adjacent groups being separated by at least one cycle in which no pulse occurs.

8. A system as claimed in claim 3 in which the duration of any one pulse expressed as a fraction of a cycle of the impressed voltage is not more than $\frac{1}{20}$ of a cycle.

9. A system as claimed in claim 3 including means for injecting said pulses into the distributon network.

10. A system as claimed in claim 3 in which said frequency sensitive receiving means comprises filter means responsive to said pulses for providing an output signal in response thereto, phase discriminator means for providing an output signal during a predetermined portion of a cycle of voltage impressed on the supply distribution network, and switching means responsive to the output signals from the filter means and the phase discriminator means for providing an output signal upon coincidence of said signals.

11. A system as claimed in claim 3 including filter means responsive to said pulses for providing an output signal in response thereto, phase discriminator means for providing a series of output signals each corresponding to a predetermined portion of a cycle of the voltage waveform impressed on the supply distribution network and a plurality of switching means each responsive to an output signal from said filter means and to a signal from an associated one of said phase discriminator means for providing an output signal on coincidence of said signals applied to it.

12. A system as claimed in claim 3 in which each pulse is impressed on a line of the supply distribution network at that part of a cycle of the voltage impressed thereon at which the voltage crosses, is substantially zero.

13. A system according to claim 3 in which said means for injecting pulses into the distribution network comprises a capacitor, means for charging the capacitor from a direct current potential source and gate switch means for discharging said capacitor to the network at a predetermined point of the cycle of the voltage impressed on the network.

14. A system according to claim 13 in which said direct current potential source is derived from a rectifier connected to the network.

15. A system according to claim 13 in which said gate switch means discharges the capacitor into the network through a tuned circuit.

16. A system according to claim 15 in which said tuned circuit comprises windings on one limb of a transformer forming part of said supply distribution network, an inductor and capacitor connected in a series circuit, and in which said first-mentioned capacitor is connected in parallel with said inductor through a limiting impedance and said gate switch means.

17. A system according to claim 13 including selectively operable means for discharging said capacitor on to any one phase of a three-phase supply on said supply distribution network, and selectively operable means for charging said first-mentioned capacitor in either direction of polarity.

18. A system according to claim 12 in which each pulse occurs substantially as the voltage on the line goes through zero from negative to positive and the pulse has a positive-going leading wave front.

19. A system according to claim 12 in which each pulse occurs as the voltage on the line goes through zero from the positive to negative and the pulse has a negative-going leading wave front.

20. A system according to claim 5 in which the receiving means includes counting means for counting the number of successive cycles of the impressed voltage in which a pulse occurs.

21. A system according to claim 20 in which said counting means is adapted to produe two or more output signals in response to the number of successive cycles counted and in which said receiving means includes means responsive to said different output signals of the counting means for selectively delivering corresponding output signals.

22. A system of transmitting and receiving intelligence or control information over an alternating current power supply distribution network, which comprises, at one location on the network, means for creating in a voltage impressed on the network a uni-directional pulse of predetermined polarity at a predetermined point in each of a predetermined number of successive cycles of said voltage, and, at at least one other location on the network, receiving means responsive to said pulses for delivering an output signal.

23. A system according to claim 22 in which the pulses created extend over several seconds.

24. A system according to claim 22 in which the pulses extend over one second or less.

25. A system according to claim 23 in which the duration of any one pulse expressed as a fraction of a cycle of the impressed voltage is not more than $\frac{1}{20}$ of a cycle.

26. A system according to claim 23 including means for creating said pulses directly in the distribution network.

27. A system according to claim 26 in which means for directly creating the pulses in the distribution network comprises means for drawing a direct current component from one winding of a transformer forming part of said cycle distribution network.

28. A system according to claim 27 in which the transformer is a three-phase transformer and in which the means for drawing a direct current component comprises a rectifier and impedance combination connected across one secondary winding of the transformer.

29. A system according to claim 28 in which said impedance comprises a resistor.

30. A system as claimed in claim 28 in which said impedance comprises a choke.

31. A system according to claim 28 including selectively operable means for drawing a direct current component in either direction from any one of the secondary windings.

32. A system according to claim 27 in which said receiving means comprises filter means responsive to said pulses for providing an output signal in response thereto, means for providing a phase discriminator for providing an output signal during a predetermined portion of a cycle of voltage impressed on the supply distribution network and switching means responsive to the output signals from the filter means and the phase discriminator means for providing an output signal upon coincidence of said signals.

33. A system according to claim 27 including filter means responsive to said pulses for providing an output signal in response thereto, phase discriminator means for providing a series of output signals each corresponding to a predetermined portion of a cycle of the voltage wave-form impressed on the supply distribution network and a plurality of switching means each responsive to an output signal from said filter means and to a signal from an associated one of said phase discriminator means for providing an output signal on coincidence of said signals applied to it.

34. A system according to claim 33 in which each pulse is impressed on a line of the supply distribution network at that part of a cycle of the voltage impressed thereon at which the voltage crosses, is substantially zero.

35. A system according to claim 34 in which each pulse occurs substantially as the voltage on the line goes through zero from negative to positive and the pulse has a positive-going leading wave front.

36. A system according to claim 34 in which each pulse occurs as the voltage on the line goes through zero from positive to negative and the pulse has a negative-going leading wave front.

37. A system of transmitting and receiving intelligence or control information over an alternating current power supply network, which comprises first means at one location on the network for creating in a voltage impressed on the network selectively any one series of a plurality of first series of uni-directional pulses each pulse occurring at a predetermined point in a different cycle of said voltage, and second means for creating a following second series of pulses in said network in which said second creating means is adapted to create each pulse at a predetermined point in each of a predetermined number of successive cycles, each said first series of pulses extending over one second or less and each second series of pulses extending over several seconds each series of said first series of pulses serving as a select command and each said second series of pulses acting as an operate command, and, at least one other location on said network, receiving means responsive to a preselected one series of said first series of pulses to be conditioned thereby, and when so conditioned additionally responsive to the next following second series of pulses for executing a control function associated with power consuming means connected to said network.

38. A system according to claim 37 in which said first means includes means for varying selectively the point in a cycle at which a pulse occurs and in which said receiving means includes phase discriminating means for detecting the phase of pulses relatively to a cycle of the impressed voltage and determining which of two or more output signals is to be provided.

39. A system according to claim 37 in which the receiving means includes counting means for counting the number of successive cycles of the impressed voltage in which a pulse occurs.

40. A system according to claim 39 in which said counting means is adapted to produce two or more output signals in response to the number of successive cycles counted and in which said receiving means includes means responsive to said different output signals of the counting means for selectively delivering corresponding output signals.

41. A system according to claim 37 in which the pulses in at least some series of said first series are split into two or more groups, adjacent groups being separated by at least one cycle in which no pulse occurs.

42. A system according to claim 37 in which the duration of any one pulse expressed as a fraction of a cycle of the impressed voltage is not more than $\frac{1}{20}$ of a cycle.

43. A system according to claim 37 in which said second means comprises means for creating said second series of pulses directly in the distribution network.

44. A system according to claim 37 in which said first means comprises means for injecting each said series of said first series of pulses into the distribution network.

45. A system according to claim 43 in which means for directly creating the pulse in the distribution network comprises means for drawing a direct current component from one winding of a transformer forming part of said cycle distribution network.

46. A system according to claim 45 in which the transformer is a three-phase transformer and in which the means for drawing a direct current component comprises a rectifier and impedance combination connected across one secondary winding of the transformer.

47. A system according to claim 46 in which said impedance comprises a resistor.

48. A system according to claim 46 in which said impedance comprises a choke.

49. A system according to claim 46 including selectively operable means for drawing a direct current component in either direction from any one of the secondary windings.

50. A system according to claim 44 in which said means for injecting pulses into the distribution network comprises a capacitor, means for charging the capacitor from a direct current potential source and gate switch means for discharging said capacitor to the network at a predetermined point of the cycle of the voltage impressed on the network.

51. A system according to claim 50 in which said direct current potential source is derived from a rectifier connected to the network.

52. A system according to claim 50 in which said gate switch means discharges the capacitor into the network through a tuned circuit.

53. A system according to claim 52 in which said tuned circuit comprises windings on one limb of a transformer forming part of said supply distribution network, an inducer and capacitor connected in a series circuit, and in which said first-mentioned capacitor is connected in parallel with said inductor through a limiting impedance and said gate switch means.

54. A system according to claim 50 including selectively operable means for discharging said capacitor on to any one phase of a three-phase supply on said supply distribution network, and selectively operable means for charging said first-mentioned capacitor in either direction of polarity.

55. A system according to claim 37 in which said receiving means includes filter means responsive to any of said series of pulses for providing an output signal in response thereto, means for providing a phase discriminator for providing an output signal during a predetermined portion of a cycle of voltage impressed on the supply distribution network and switching means responsive to the output signals from the filter means and the phase discriminator means for providing an output signal upon coincidence of said signals.

56. A system according to claim 37 in which each pulse is impressed on a line of the supply distribution network at that part of a cycle of the voltage impressed thereon at which the voltage crosses or is substantially zero.

57. For use in a system of transmitting and receiving intelligence or control information over an alternating current power supply network, a detector comprising in combination filter means for providing a first signal in response to receipt of unidirectional pulses impressed upon said power supply network, phase discriminator means for providing a second series of signals corresponding to a predetermined portion of a cycle of the voltage wave-form impressed on the supply distribution network and a plurality of switching means each responsive to an output signal from said filter means and to a signal from an associated one of said phase discriminator means for providing an output signal for governing a control operation associated with at least one power consuming means connected to said network.

(References on following page)

References Cited

UNITED STATES PATENTS

| | | | |
|---|---|---|---|
| 2,305,862 | 12/1942 | Gilliver et al. | 307—140 X |
| 2,494,873 | 1/1950 | Hall | 307—140 |
| 2,972,686 | 2/1961 | Pelpel | 307—140 |

ROBERT K. SCHAEFER, Primary Examiner
T. B. JOIKE, Assistant Examiner

U.S. Cl. X.R.

307—140; 340—163, 310